United States Patent [19]
Dubey

[11] Patent Number: 5,774,685
[45] Date of Patent: Jun. 30, 1998

[54] METHOD AND APPARATUS FOR BIASING CACHE LRU FOR PREFETCHED INSTRUCTIONS/DATA BASED UPON EVALUATION OF SPECULATIVE CONDITIONS

[75] Inventor: Pradeep Kumar Dubey, White Plains, N.Y.

[73] Assignee: International Business Machines Corporation, Armonk, N.Y.

[21] Appl. No.: 426,502

[22] Filed: Apr. 21, 1995

[51] Int. Cl.⁶ .............................. G06F 9/38; G06F 12/08
[52] U.S. Cl. ..................... 395/381; 395/382; 395/383; 395/582; 395/584; 395/460; 395/461; 395/462; 395/463; 395/800.23; 364/DIG. 1; 711/122; 711/123; 711/133; 711/137
[58] Field of Search ................................ 395/375, 425, 395/449, 800, 381, 383, 414, 421.03, 582, 450, 457, 460, 463, 467, 37 G, 584, 800.23; 364/200, DIG. 1; 711/122, 123, 133, 137

[56] References Cited

U.S. PATENT DOCUMENTS

| | | | |
|---|---|---|---|
| 4,719,568 | 1/1988 | Carrubba et al. | 711/123 |
| 5,377,336 | 12/1994 | Eickemeyer et al. | 395/383 |
| 5,511,175 | 4/1996 | Favor et al. | 395/392 |
| 5,526,510 | 6/1996 | Akkary et al. | 711/133 |
| 5,537,573 | 7/1996 | Ware et al. | 711/137 |
| 5,551,001 | 8/1996 | Cohen et al. | 711/122 |
| 5,553,255 | 9/1996 | Jain et al. | 395/582 |
| 5,611,071 | 3/1997 | Martinez, Jr. | 711/133 |

FOREIGN PATENT DOCUMENTS

| | | | |
|---|---|---|---|
| 0614146 A1 | 2/1993 | European Pat. Off. | G06F 12/08 |
| 226050 | 7/1994 | Taiwan | G06F 9/45 |

OTHER PUBLICATIONS

T–F. Chen et al., "A Performance Study of Software and Hardware Data Prefetching Schemes", 1994 Annual International Symp. on Computer Architecture, IEEE, Computer Society Press.

W.Y. Chen et al., "Tolerating First Level Memory Access Latency In High–Performance Systems", 1992 International Conf. on Parrallel Processing, pp. I–36–I–43.

T.C. Mowry et al., "Design and Evaluation of a Compiler Algorithm for Prefetching", Proc. of 5th Inter. Conf. on Architectural Suppor for Programming Languages and Operating Systems. ASPLOS 1992 pp. 62–73.

A.C. Klaiber et al., "An Architecture for Software–Controlled Data Prefetching" Proc. 18th Annual Intl. Symposium on Computer Architecture, 1991, pp. 43–63.

D. Callahan et al., "Software Prefetching" Sigplan Notices Apr. 1991, pp. 40–52, vol. 26, Issue 4.

*Primary Examiner*—Parshotam S. Lall
*Assistant Examiner*—Bharat Barot
*Attorney, Agent, or Firm*—Jay P. Sbrollini

[57] ABSTRACT

The computer processing unit of the present invention includes a new prefetch instruction, referred to as an STOUCH instruction, which provides the capability to encode compile-time speculations associated with the conditional branches between the time the prefetch request is initiated and the time the prefetched data is actually needed. As a result of this explicit communication of compile-time speculations to the run-time hardware, prefetched lines based on invalid speculations can be discarded earlier, whereas, prefetched lines based on valid speculations can be retained longer in the cache, leading to better cache performance.

62 Claims, 9 Drawing Sheets

METHOD AND APPARATUS FOR BIASING CACHE LRU FOR PREFETCHED INSTRUCTIONS/DATA BASED UPON EVALUATION OF SPECULATIVE CONDITIONS

BACKGROUND OF THE INVENTION

1. Technical Field

The invention relates to computer processing units and, more particularly, to the prefetching of instructions and data into cache memory of the computer processing unit.

2. Description of the Related Art

Instruction cycle times of computer processing units have been decreasing at the rate of about 50% per year, while memory access times have been decreasing at 5 to 10% per year. As a result, computer processing units have begun to utilize aggressive prefetching techniques. Aggressive prefetching ensures that a block of instructions and/or data is stored in cache when it is actually needed, thus hiding potentially large memory access delays.

A computer processing unit may attempt to dynamically learn the access pattern used for effective prefetching. Such dynamic (run-time) prefetching techniques may require significant hardware and may not be very effective at learning complicated access patterns for instructions and/or data. Alternatively, prefetch support may be in the form of compiler-directed run-time prefetching of cache lines. Moreover, the computer processing unit may offer support for prefetching of a cache block. Current microprocessors, such as the PowerPC 601, include new instructions, typically known as a "touch" instruction (e.g., dcbt and dcbst instructions in the PowerPC 601), to provide a hint to the machine at run time that performance would be improved if the specified block is fetched into the cache. Such a prefetch, say, in the case of data, is typically simply treated as a load operation, except that the system error handler is not invoked for a translation or protection violation.

The effectiveness of current aggressive prefetch techniques is limited. First, the prefetch may occur too early. In this case, the specified block of instructions and/or data may be flushed from the cache before it is actually needed. More importantly, aggressive prefetch is likely to run into uncertainties of program control flow. In other words, when the computer processing unit encounters an unresolved conditional branch instruction, two options exist:

(i) prefetch both blocks (i.e., block corresponding to taken branch and block corresponding to not-taken branch) or, (ii) prefetch any one of these blocks.

Both these options have the potential drawback of cache pollution in the event of incorrect branch speculation. Cache pollution implies that the cache is forced to contain useless blocks, which in turn further increases the probability that instructions and/or data will be flushed from the cache before they are actually needed, thus offsetting the performance gain due to prefetching. Importantly, more aggressive prefetch under these conditions implies more cache pollution, and hence the performance potential of prefetching is restricted.

Accordingly, it is an object of the present invention to provide an improved method of fetching instructions and data, beyond multiple unresolved branches.

It is a further object of the present invention to provide an improved method of prefetching instructions and data, beyond multiple unresolved branches, with compile-time speculation.

Additional objects and advantages of the invention will become apparent in light of the description which follows, and in part will be obvious from the description, or may be learned by practice of the invention.

SUMMARY OF THE INVENTION

To achieve the objects in accordance with the purposes of the present invention, as embodied and described herein, the computer processing unit of the present invention includes a main memory for storing sequences of instructions that are loaded into lines of an instruction cache, and transferred from the instruction cache to a processing unit for execution. A line replacement algorithm is utilized to overwrite the lines of the instruction cache. STOUCH instructions are inserted into the sequence of instructions, for example, at compile-time. The STOUCH instruction is a hint that performance will probably be improved if one or more instructions identified by the STOUCH instruction is fetched into the instruction cache, and the speculations specified by the STOUCH instruction hold true.

During execution of the sequence of instructions, if one of said instructions transferred from said instruction cache to said processing unit is an STOUCH instruction, one or more instructions identified by the STOUCH instruction are fetched from the main memory into one or more lines of the instruction cache, and the speculations associated with the STOUCH instruction are resolved.

If each of the speculations associated with the STOUCH instruction is resolved to be valid, the line replacement algorithm is biased such that the one or more lines of the instruction cache containing the one or more instructions identified by the STOUCH instruction are retained for a greater number of machine cycles than during normal operation of the line replacement algorithm.

However, if any of the speculations associated with the STOUCH instruction is resolved to be invalid, the line replacement algorithm is biased such that the one or more lines of the instruction cache containing the one or more instructions identified by the STOUCH instruction are retained for a shorter number of machine cycles than during normal operation of the line replacement algorithm.

The present invention discloses a similar scheme to prefetch data into a data cache.

By biasing the line replacement algorithm according to the resolution of speculations specified by the STOUCH instruction, cache pollution is reduced and the performance of the system is enhanced.

DETAILED DESCRIPTION OF THE PREFERRED EMBODIMENTS

Definitions

Before discussing details, the following set of working definitions may be useful:

[1] Prefetch—A prefetch of instructions or data refers to fetching of instructions or data from higher levels of memory hierarchy (for example, the main memory) to lower levels of memory hierarchy (e.g., the on-chip caches), assuming the instructions or data are missing in the lower levels of memory hierarchy, before the instructions or data are actually needed. An instruction is considered actually needed if the program control has reached a point where it is ready to fetch and attempt to decode and execute the instruction under consideration. A data value is considered actually needed if one or more instructions using the data value as an operand are ready for execution.

[2] Speculative Prefetch—the prefetch of instructions or data with one or more unresolved branches.

[3] Sequential Trace Order (STO)—The dynamic order of execution sequence of program instructions, resulting from the complete execution of the program on a single-control-thread, non-speculative machine that executes instructions one-at-a-time.

Overview

In computer systems, instructions generated using a compiler or assembly programmer are placed in a sequence in an instruction memory prior to run time. This sequence is called the static order. A dynamic order is the order in which the computer executes these instructions. The dynamic order may or may not be the static order. In the discussion to follow, the phrase "compile time" is used to refer to the timing of any prior-to-run-time processing. Note however that although such a processing is very likely to be carried out by a compiler, other means, such as, assembly level programming, could also be employed instead.

The present invention proposes a prefetching scheme which associates explicit control flow speculations with each speculative prefetch. The prefetching scheme is based on compile-time analysis to determine specific locations within a program where instruction or data cache misses are likely to be encountered at run-time. Non-sequential branch targets or irregular data accesses are typical examples of cache accesses which are likely to cause a cache-miss. In order to minimize the performance impact of such cache-misses, the compiler identifies a set of points where it can provide an early hint to the run-time hardware to initiate a prefetch to hide the potential miss penalty associated with the cache accesses identified before. In the discussion to follow, such static program locations are referred to as "prefetch points". This may also involve compile-time code restructuring to enable earlier availability of the address of such accesses.

Figure 1:
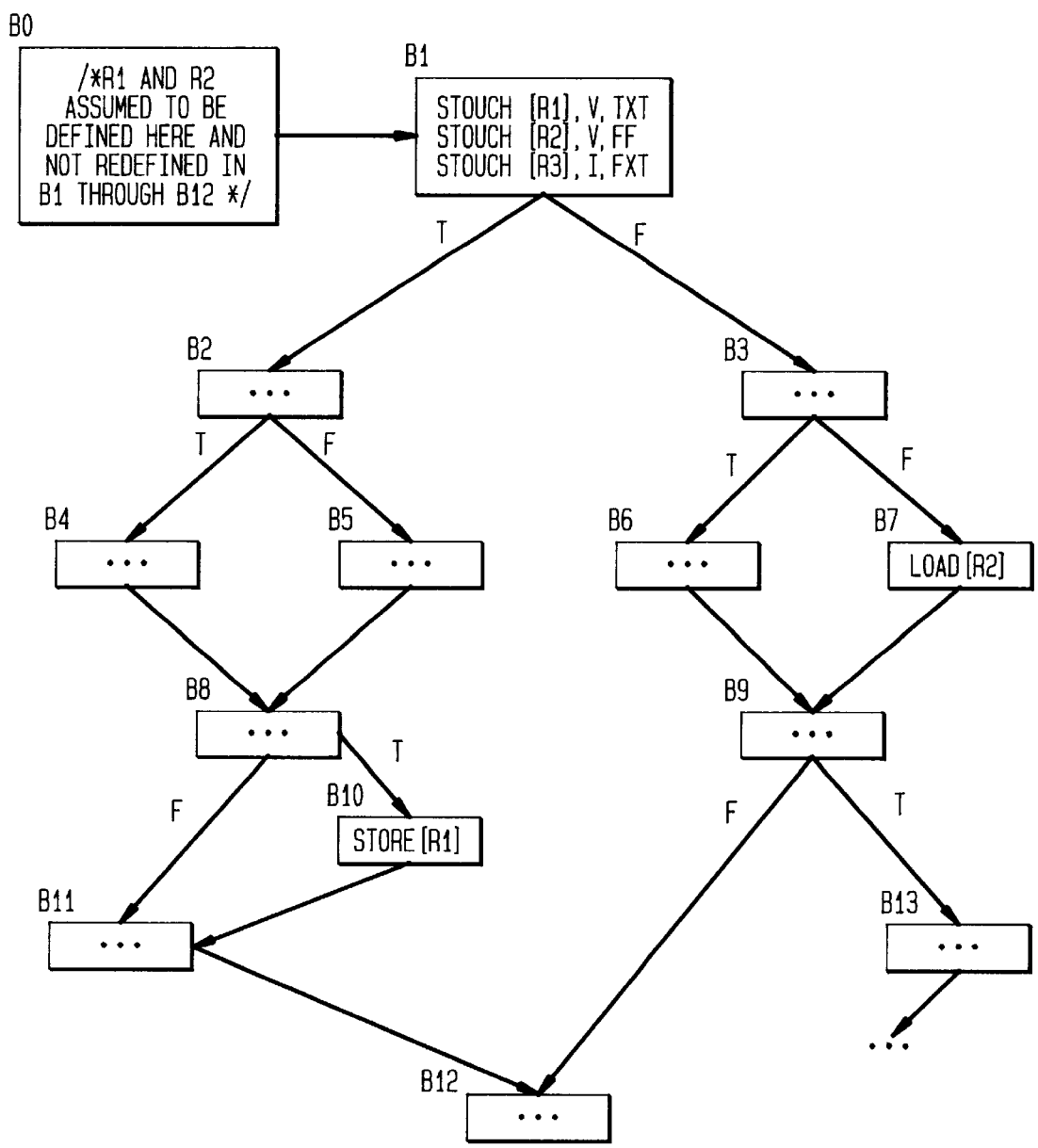
FIG. 1 is a control flow graph of a program that utilizes an STOUCH instruction for instruction and data prefetch according to the present invention.

Referring to FIG. 1, consider the control flow graph of a program. Each node of the graph refers to a group or block of non-branch instructions, optionally ending with a branch instruction. Any block of code-sequence that ends with a conditional branch has one edge labelled F to the block to which the control is transferred if the branch is not taken or falls through, and another edge labelled T to the block to which the control is transferred if the branch is taken. The remaining blocks either end with a non-branch instruction or with an unconditional branch to a unique target block. An unlabelled edge is shown from the block from where the control flows to the block to which the control flows.

Suppose, for example, there is a store instruction in block B10 which is identified at compile-time as one which is likely to cause a cache-miss at run time. To hide the potential miss-delay associated with this access, the compiler may identify a prefetch point in Block B1, for example. Note that there are three conditional branches between block B1 and block B10, namely, those at the end of blocks B1, B2, and B8. Therefore, it is possible that the intervening branch outcomes at run-time is such that the control does not flow from block B1 to block B10, and the prefetch initiated in block B1 is wasted, and pollutes the cache, by potentially displacing a more useful cache line.

The present invention proposes a new prefetch instruction, referred to as an STOUCH instruction, which provides the compiler with the ability to encode compile-time speculations associated with the conditional branches between the time the prefetch request is initiated and the time the prefetched data is actually needed. As a result of this explicit communication of compile-time speculations to the run-time hardware, prefetched lines based on invalid speculations can be discarded earlier, whereas, prefetched lines based on valid speculations can be retained longer in the cache, leading to better cache performance. The details of the semantics of the instruction and the operation of the computer processing system in executing the instruction follow.

Detailed Description of STOUCH Instruction

The STOUCH instruction of the present invention is a hint that performance will probably be improved if the block containing the byte addressed by the effective address implied by this instruction is fetched into the cache, and the specified speculations associated with the branch sequence that dynamically follows this instruction hold, in which case the program will soon access the identified block. Executing the STOUCH instruction will not cause the system error handler to be invoked.

Figure 2:
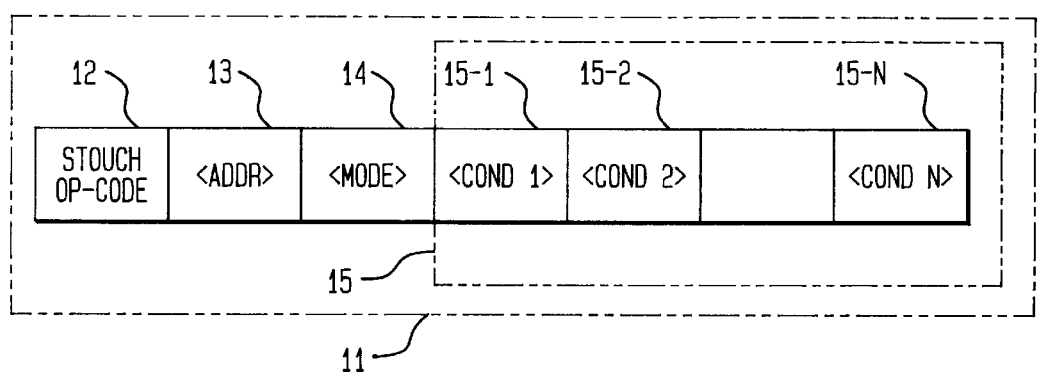
FIG. 2 illustrates the format of the STOUCH instruction of the present invention.

As shown in FIG. 2, the STOUCH instruction 11 preferably includes an STOUCH op-code field 12, an address field 13, and a condition field 15. The address field 13 unambiguously identifies the address of an instruction or data cache block. The condition field 15 specifies a set of compile-time speculations <cond_1>, <cond_2> . . . <cond_N> (labeled 15-1 . . . 15-N). N refers to the maximum number of permitted speculations and is a function of the number of available op-code bits for the STOUCH instruction encoding in a given architecture. The STOUCH instruction 11 may also include a mode bit 14 that is used to interpret the set of conditions <cond_1> through <cond_n> in one of two ways.

For example, if the mode bit 14 is set to valid (V), the associated prefetch may be considered recommended provided all of the compile-time specified conditions (<cond_1> through <cond_N>) associated with the STOUCH instruction evaluate to true at run time. However, if the mode bit 14 is set to invalid (I), the associated prefetch may not be considered recommended if all of the compile-time specified conditions (<cond_1> through <cond_N>) associated with the STOUCH instruction evaluate to true at run time.

The semantics of the condition field 15 is explained in more detail below. To simplify the discussions to follow, the "dependence region" of an STOUCH instruction is defined as the sequence of instructions in the STO that starts with the first instruction after the STOUCH instruction and is terminated on encountering the first instruction immediately after which the instruction and or data prefetched by the STOUCH instruction is actually needed.

More specifically, the condition field 15 of the STOUCH instruction 11 encodes compile-time speculation on the outcome of a sequence of one or more branches as <cond_1>, <cond_2> . . . <cond_N>. The first condition in the sequence, cond_1 (labeled 15-1), is associated with the first dynamically encountered unique conditional branch in the dependence region of the STOUCH instruction. The second condition in the sequence, cond_2 (labeled 15-2), is associated with the second dynamically encountered unique conditional branch in the dependence region of the STOUCH instruction, and so on. Only the branches residing at different instruction locations are considered unique.

Furthermore, the conditions which encode the compile-time speculation of a specific branch outcome are preferably one of the following three conditions: taken (T), fall through (F) (i.e., not-taken) and don't care (X). Alternatively, the speculation associated with the conditions may be restricted to be either taken (T) or fall-through (F).

More precisely, the set of conditions <cond_1> through <cond_N> (labeled 15-1 through 15-N) associated with a STOUCH instruction 11 encode compile-time speculation regarding the control path to be followed in the associated dependence region. Intuitively speaking, a compiler would use the valid mode setting for encoding a good path through the control flow region from the prefetch point to the regular access point, whereas, the compiler would use the invalid mode setting for encoding a bad path through the control flow region from the prefetch point to the regular access point.

To further clarify the condition encoding format of the STOUCH instruction 11, consider the following examples with reference to FIG. 1:

STOUCH [R1], V, T, X, T
    This encoding implies that prefetch of the cache block associated with the address in register R1 is recommended provided: the first conditional branch in the dependence region of the STOUCH instruction (i.e., the branch at the end of block B1) is taken, the second conditional branch in the dependence region of the STOUCH instruction (i.e., the branch at the end of block B2) can go either way, and, the third conditional branch in the dependence region of the STOUCH instruction (i.e., the branch at the end of block B8) is taken. In case the run-time control flow does not follow this speculated path, and hence does not lead to the store in block B10, the prefetched cache block may be discarded to avoid the adverse performance effects of associated cache pollution. Note that this particular interpretation of the set of compile-time speculations is due to the associated valid V mode-bit setting.

STOUCH [R2], V, F, F
    This encoding implies that prefetch of the cache block associated with the address in register R2 is recommended provided: the first conditional branch in the dependence region of the STOUCH instruction (i.e., the branch at the end of block B1) is of fall-through type, and, the second conditional branch in the dependence region of the STOUCH instruction (i.e., the branch at the end of block B3) is also of the fall-through type. In case the run-time control flow does not follow this speculated path, and hence does not lead to the load in block B7, the prefetched cache block may be discarded to avoid the adverse performance effects of associated cache pollution. Note that this particular interpretation of the set of compile-time speculations is due to the associated valid (V) mode-bit setting.

STOUCH B12, I, F, X, T
    This encoding implies that prefetch of the cache block associated with block B12 is considered unnecessary only if: the first conditional branch in the dependence region of the STOUCH instruction (i.e., the branch at the end of block B1) falls through, the second conditional branch in the dependence region of the STOUCH instruction (i.e., the branch at the end of block B3) can go either way, and, the third conditional branch in the dependence region of the STOUCH instruction (i.e., the branch at the end of block B9) is taken. In case the run-time control flow follows this speculated path, the prefetched cache block may be discarded to avoid the adverse performance effects of associated cache pollution. In case the run-time control flow does not follow this speculated path, a prefetch of block B12 is recommended. Note that this particular interpretation of the set of compile-time speculations is due to the associated invalid (I) mode-bit setting.

Note that if the code region between the prefetch point and the access point, is restricted to be loop-free, the dynamic sequence of branches encountered after the STOUCH instruction would be all unique. In other words, under these circumstances, the first unique conditional branch would simply be the first dynamically encountered conditional branch, the second unique conditional branch would simply be the second dynamically encountered conditional branch, and so on.

Figure 3:
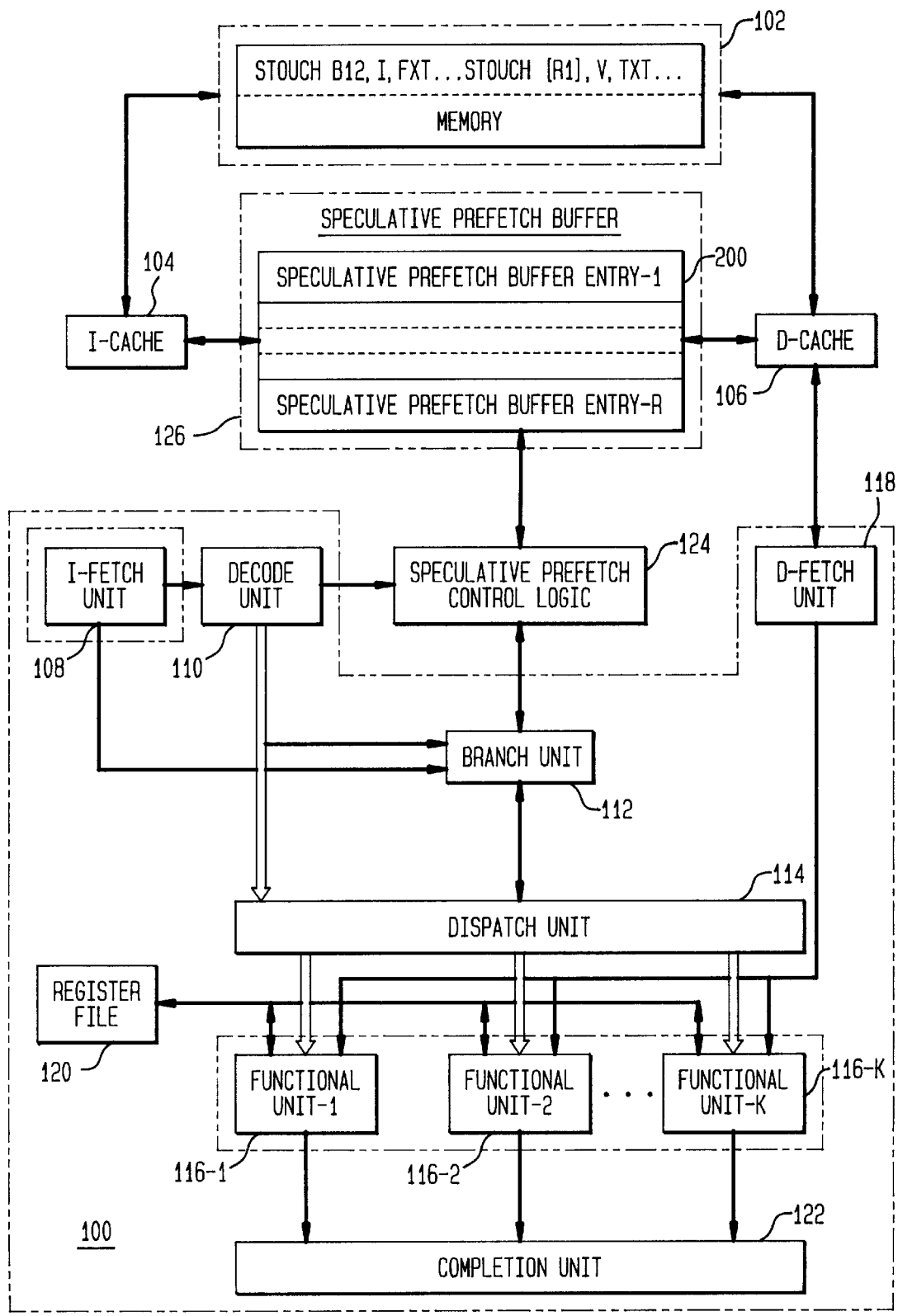
FIG. 3 is a functional block diagram of a computer processing system for executing the STOUCH instruction according to the present invention.

Detailed Description of The Computer Processing System for Executing the STOUCH Instruction FIG. 3 is a functional block diagram illustrating a computer processing system capable of executing the STOUCH instruction of the present invention. The computer processing system includes a processor unit 100 and an associated memory unit 102. The memory unit 102 holds program data and instructions to be executed on the processor unit 100. As is conventional, the memory unit 102 is interfaced with an instruction cache unit 104 and a data cache unit 106 such that frequently used instruction and data portions of the memory unit 102 are kept in an instruction cache unit 104 and data cache unit 106, respectively. Alternatively, the instruction and data cache units 104,106 may be merged into a single unified cache. Access time for the cache units 104, 106 are typically much smaller than that of the memory unit 102. The instruction cache and/or data cache units 104,106 may also be comprised of multiple caches or multilevel caches as is also well known.

Typically, the instructions/data stored in the instruction cache 104 and data cache 106, respectively, are divided into lines or blocks. An instruction fetch unit 108 fetches one or more blocks of instructions stored in the instruction cache 104 into a decode unit 110. The decode unit 110 forwards the branch and condition register update instructions to a branch unit 112 for execution and forwards sequential (non-branch instructions) to a dispatch unit 114. The dispatch unit 114 analyzes dependencies among pending instructions, and schedules execution of instructions on one or more functional units 116.

A D-Fetch unit 118 handles fetching of blocks of data from the data cache 106 into the functional units 116 as needed. The data cache unit 106 holds data values used as source operands by the instructions and some of the data values generated by executed instructions. Since multiple memory-resident data values may be simultaneously required by the functional units 116 and multiple memory-bound results may be simultaneously generated, the data cache unit 106 is typically multi-ported.

The processing unit 100 also includes a register file 120 containing a set of registers. The register file 120 provides operands to the functional units 116 for executing instructions and also receives results of execution. This set is further broken down into architecturally visible set of registers and architecturally invisible registers. Architecturally visible, or architected registers, refer to the fixed set of registers that are accessible to the assembly level programmer (or the compiler) of the machine. Such a register file 120 is well known in prior art.

Each functional unit 116 may be capable of executing some or all types of instructions. The functional units 116 receive input source operands from and write the output results to the register file 120 and/or the data cache unit 106. In the preferred embodiment, all the functional units 116 are identical and hence capable of executing any instruction. Alternatively, the functional units 116 may be asymmetric, where a specific unit is capable of executing only certain subset of instructions. In this case, the dispatch unit 114 must be aware of this asymmetry and schedule the instructions appropriately.

The processor unit 100 also includes a completion unit 122 responsible for completing instruction execution in an order considered a valid order by the architecture. Even though the functional units 116 may execute instructions out-of-order, the processor unit 100 may or may not be allowed to complete the instructions in the same order, depending on the architectural constraints.

The branch unit 112 predicts unresolved branches, and determines the validity of each prediction on branch resolution. The branch unit 112 also includes a condition register, which is used for evaluating the outcome of conditional branches, and logic that updates the condition register according to the results of operations performed by the functional units 116.

According to the present invention, the instructions stored in the instruction cache unit 104 include one or more STOUCH instructions as described above. The decode unit 110 identifies STOUCH instructions and forwards the STOUCH instructions to a speculative prefetch control unit 124. The speculative prefetch control unit 124 controls the speculative prefetch of instructions according to the STOUCH instructions and adds entries to a speculative prefetch buffer 126 corresponding to the STOUCH instructions. In addition, the branch unit 112 forwards each branch outcome to the speculative prefetch control unit 124. The branch outcome information may be in sequential trace order, for the sake of simplicity, even if branches resolve out-of-order within the branch unit 112. Alternatively, the branch unit 112 could pass out-of-order branch outcome information onto the speculative prefetch control unit 124, yet this requires appending the associated branch ID with each outcome. The branch outcome information is used by the speculative prefetch control unit 124 for evaluating the speculation tag associated with the entries of the speculative prefetch buffer 126 and controlling the overwriting of the instruction and/or data cache units 104, 106 based upon this evaluation. Also, alternatively, the condition register could be made part of the register file 120 and updated similar to that of any other architected register as part of the semantics of a different arithmetic instruction.

Figure 4:
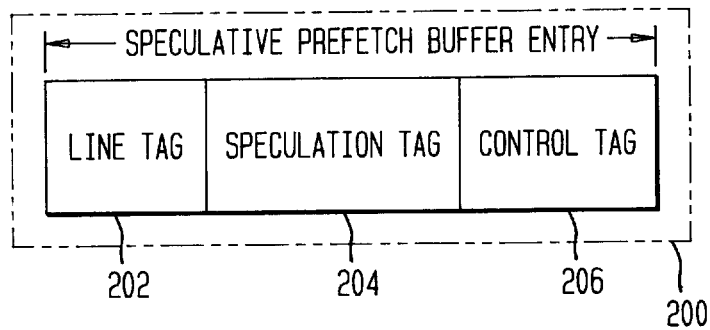
FIG. 4 illustrates the format of entries of the speculative prefetch buffer of FIG. 3.

The speculative prefetch control unit 124 and speculative prefetch buffer 126 are unique to the present invention and are primarily responsible for implementing the semantics of the STOUCH instruction. As shown in FIG. 4, each entry 200 of the speculative prefetch buffer 126 includes a line tag 202, a speculation tag 204 and a control tag 206. The line tag 202 uniquely associates the entry 200 with a specific line in the instruction cache unit 104 or data cache unit 106. Typically, a cache organization (instruction or data) consists of a directory part that contains line tags used for addressing the proper line, and the data part that contains the data associated with the line. In this case, the line tag associated with each entry can be easily derived from the directory contents associated with the cache line being speculatively prefetched. Alternatively, a separate prefetch buffer may be used for holding prefetched lines (speculative or not). In this case, the line tag 202 of the entry 200 may simply refer to the appropriate index in the prefetch buffer for the line under consideration. The speculation tag 204 of the entry is derived from the compile-time speculations encoded in the STOUCH instruction. The speculation tag 204 is described below in more detail. Finally, the control tag 206 of the entry is used for evaluating the compile-time speculations in the speculation tag 204. The sub-fields associated with the control tag 206 are described below. The algorithms used for initializing and updating the control tag 206 are also described below.

Figure 5:
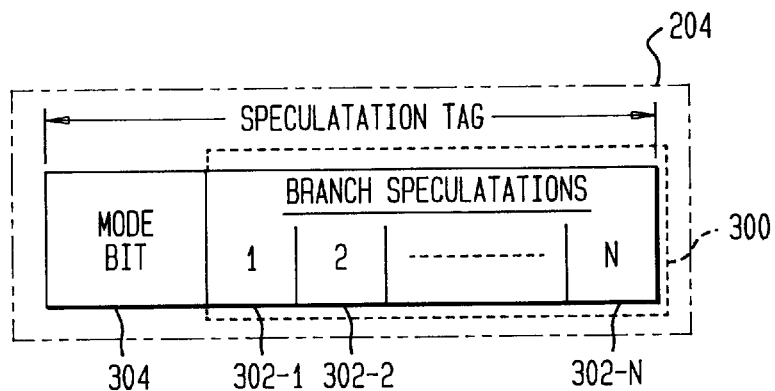
FIG. 5 illustrates the sub-fields of the speculation tag of the entry of FIG. 4.

As shown in FIG. 5, the speculation tag 204 of each entry 200 preferably includes a speculation field 300 consisting of a plurality of sub-fields 302-1 through 302-N. As described above, N refers to the maximum number of permitted speculations and is a function of the number of available op-code bits for the STOUCH instruction encoding in a given architecture. The sub-fields 302-1 through 302-N each contain data that encodes the compile-time speculation associated with the first unique dynamic branch encountered after the STOUCH instruction through the Nth dynamically encountered unique branch after the STOUCH, respectively. Moreover, each speculation tag 204 may also include a mode bit 304 used for interpreting the sub-fields 302-1 through 302-N of the speculation field 300 in one of two ways. More particularly, for example, if the mode bit 304 is set to valid (V), the associated entry may be considered recommended provided all of the compile-time conditions encoded in sub-fields 302-1 through 302-N evaluate to true at run time. Yet, if the mode bit 304 is set to invalid (I), the associated entry 200 may not be considered recommended if all of the compile-time conditions encoded in sub-fields 302-1 through 302-N evaluate to true at run time.

Figure 6:
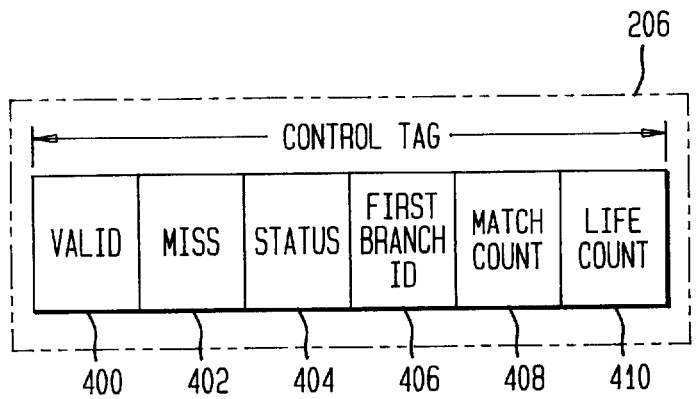
FIG. 6 illustrates the sub-fields of the control tag of the entry of FIG. 4.

Moreover, as illustrated in FIG. 6, the control tag 206 of each entry may include one or more of a valid bit 400, a miss bit 402, a status field 404, a first Branch ID field 406, a match count field 408, and a life count field 410. The valid bit 400, when set, indicates the associated entry 200 is valid. However, the valid bit 400 when cleared indicates the entry 200 is invalid. On the other hand, the miss bit 402 when set indicates that the cache line associated with the entry 200 was found missing in the cache and was fetched from higher levels of memory hierarchy in response to the STOUCH prefetch request. Yet, the miss bit 402 when cleared indicates the line recommended for prefetch by the STOUCH instruction corresponding to the entry was found present in the cache. The status field 404 records the status of the speculatively prefetched line. It is initialized to an unresolved status and is evaluated later to either resolved valid or resolved invalid, as described below in the control-tag update algorithm with respect to FIG. 13.

The First Branch ID field 406 is initialized to the run-time ID of the first conditional branch that is encountered dynamically after the STOUCH instruction, in STO. This information is used to establish the range of conditional branches a specific STOUCH instruction can be potentially dependent on. This range starts with the branch with the first branch ID and ends after N successive unique conditional branches in STO. Branches outside this range do not play any role in evaluating the validity of the speculations associated with the corresponding cache line.

The match count field 408 represents a count of the number of compile-time speculations that have matched with run-time outcomes. It is used for evaluating the validity of compile-time speculations, as discussed below in the control-tag update algorithm with respect to FIG. 13.

Finally, the life count field 410 represents a count of the number of times the associates cache line was not replaced, after being identified as a replacement candidate by the default cache replacement algorithm. The information in this field is used for biasing the default line replacement algorithm used for the instruction and data caches. The biased line replacement algorithm is described below in greater detail with respect to FIG. 12.

Detailed Description of the Method of Executing the STOUCH Instruction

Figure 7:
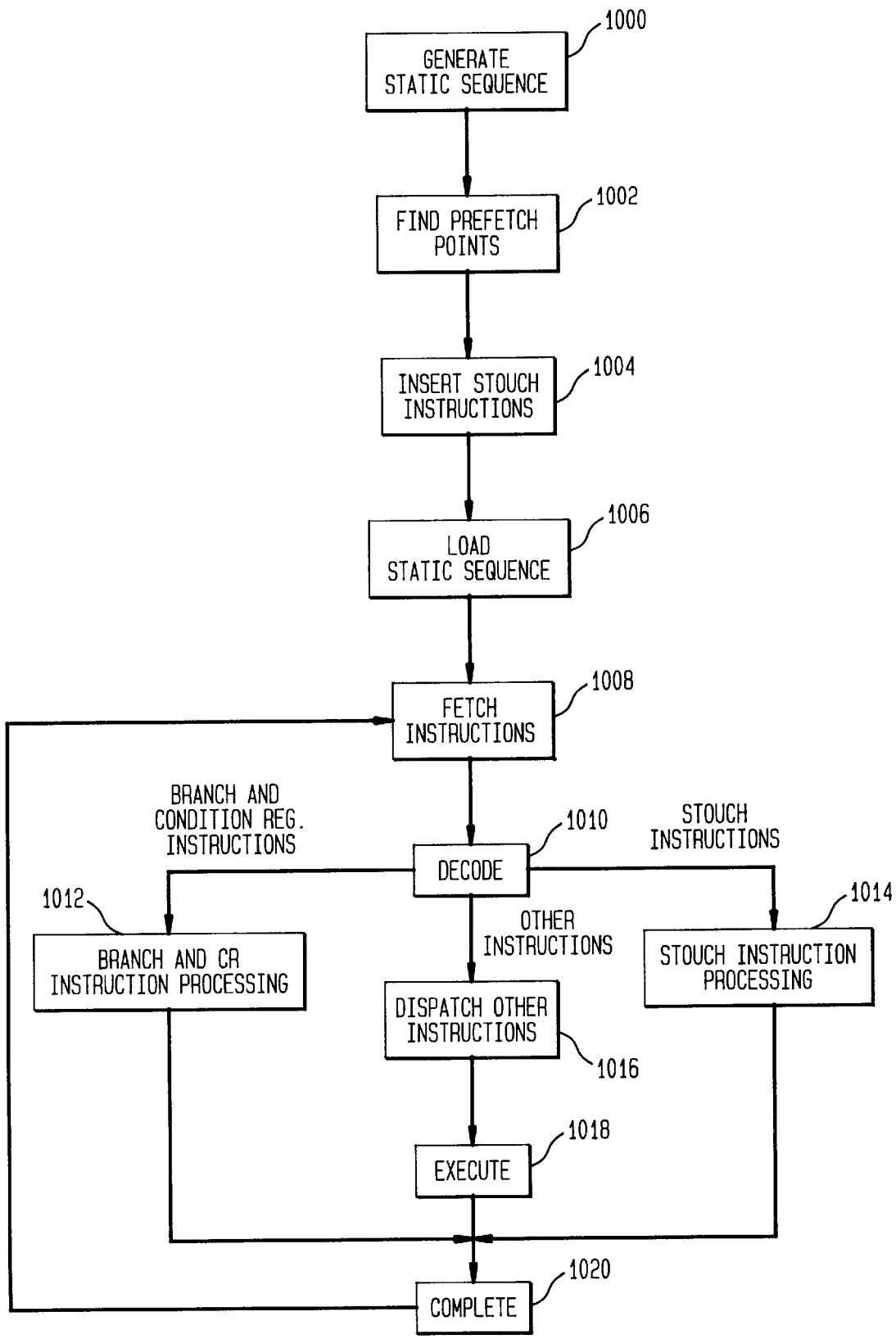
FIG. 7 is a flow chart illustrating the operation of the computer processing system of FIG. 3 in executing the STOUCH instruction according to the present invention.

FIG. 7 is a flow chart illustrating the steps in executing the STOUCH instruction described above. Initially, at compile time, the compiler in step 1000 generates a static sequence of instructions, without any regard to STOUCH instructions as described above. In step, 1002, the compiler analyzes the static sequence to identify specific locations within the sequence wherein instruction or data cache misses are likely to be encountered at run-time, and, according to the identified locations within the static sequence, the compiler identifies a set of points, called prefetch points, where it can provide an early hint to the run-time hardware to initiate a prefetch to hide the potential miss penalty associated with the cache accesses at the identified locations. The identification of prefetch points may further involve data and control dependence analysis based on, for example, some or all of the corresponding program dependence graph (combination of control dependence graph and data dependence graph). In step 1004, the compiler inserts one or more STOUCH instructions as described above at the prefetch points identified in the step 1002.

In step 1006, at run time, the computer processing system loads the compiled static sequence of instructions, including the STOUCH instructions inserted into the static sequence in step 1004, into the memory 102 of FIG. 3. As described above, the memory system 102 is interfaced to the instruction cache 104 of the computer processing system. As is conventional, sub-sequences of the static sequence stored in the memory 102 are periodically transferred to the instruction cache 104 for execution.

Figure 8:
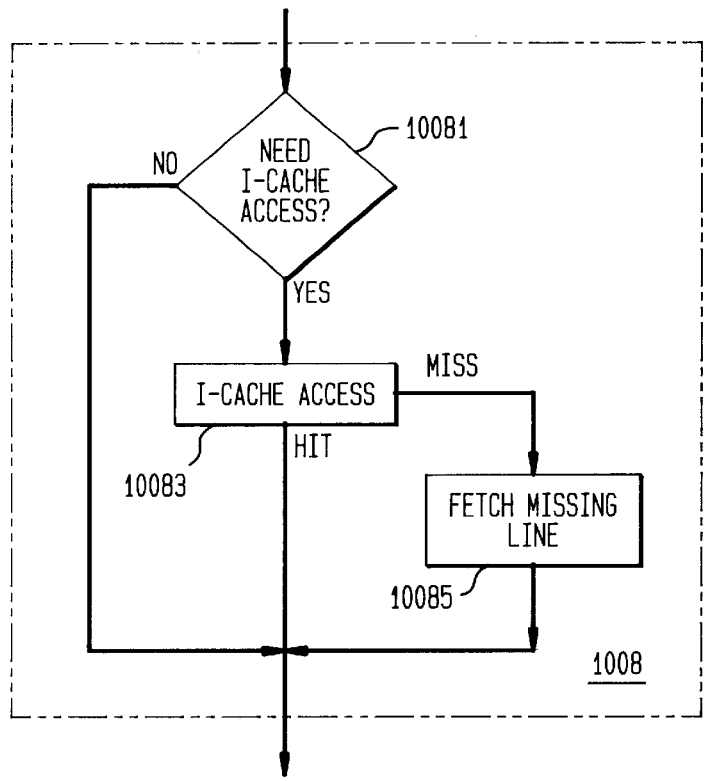
FIG. 8 illustrates the sub-steps associated with the "Fetch instruction" step of FIG. 7.

In step 1008, the I-fetch unit 108 fetches the next instruction sequence from the instruction cache 104 by addressing the instruction cache unit 104. If the next instruction sequence is missing from the instruction cache unit 104, it is fetched from the memory 102 into the instruction cache unit 104. FIG. 8 describes step 1008 in more detail.

In step 10081, the I-Fetch unit 108 determines if the decode unit 110 is ready to accept more instructions, which further implies that an instruction cache access is required for fetching more instructions. If the I-fetch unit 108 determines the decode unit 110 is ready to accept more instructions, in step 10083 the I-Fetch unit 108 accesses the instruction cache unit 104 by sending the instruction fetch address to the instruction cache unit 104. In step 10083, if the instructions identified by the instruction fetch address are present in the instruction cache unit 104, a cache hit occurs and corresponding instructions are transferred from the instruction cache unit 104 to the decode unit 110 and flow continues to step 1010. However, if the instructions identified by the instruction fetch address are not present in the instruction cache unit 104, a cache miss occurs and flow continues to step 1085 to fetch the missing line of instructions. A more detailed description of the steps in fetching the missing line of instructions into the instruction cache unit 104 is described below with reference to FIG. 12. After the missing line of instruction has been fetched into the instruction cache unit 104 in step 10085, operation continues to step 1010.

In step 1010 of FIG. 7, the decode unit 110 decodes one or more instructions simultaneously. Instructions decoded as branch instructions, or those involving condition register updates, are forwarded by the decode unit 110 to the branch unit 112. Instructions decoded as STOUCH instructions are forwarded by the decode unit 110 to the speculative prefetch control logic 124. Finally, instructions requiring the use of one or more of the functional units 116 are forwarded by the decode unit 110 to the dispatch unit 114 for dependence analysis and dispatch to the functional units 116.

Figure 9:
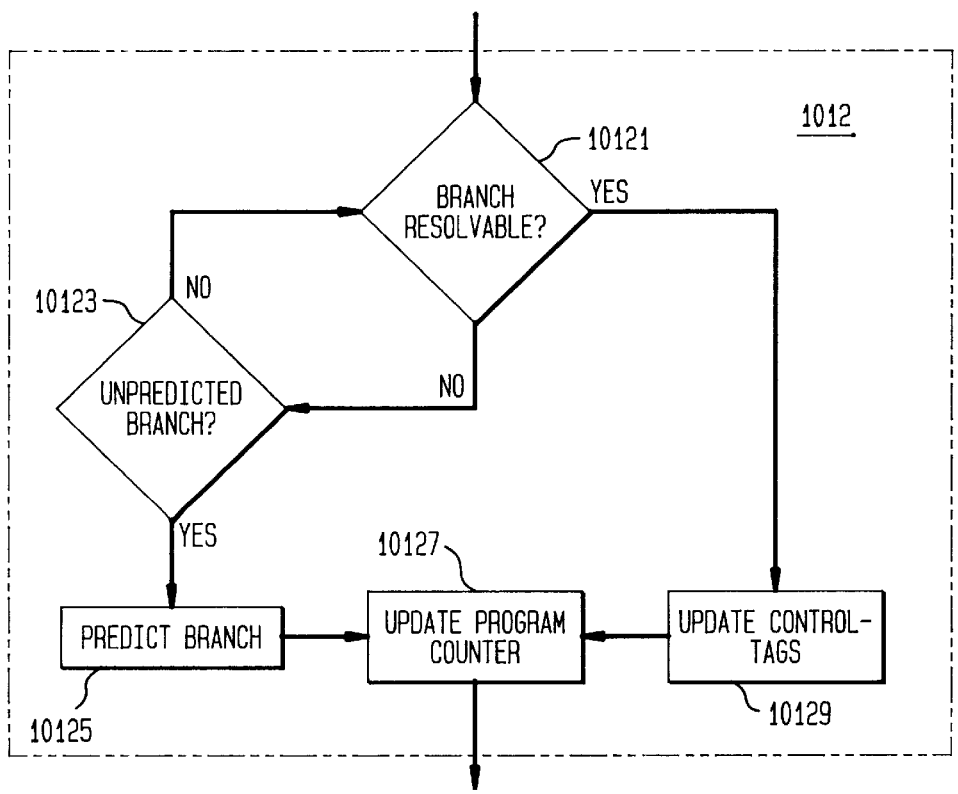
FIG. 9 illustrates the sub-steps associated with the "Branch and CR instruction processing" step of FIG. 7.

In step 1012, the branch unit 112 processes instructions decoded as branch instructions or as instructions which manipulate the condition register. A more detailed description of the step 1020 is shown in FIG. 9. More specifically, in step 10121, the branch unit 112 determines if the decoded branch instruction is resolvable. A conditional branch is considered resolvable only after the condition register bit upon which it depends has been updated. In step 10123, the branch unit 112 checks to determine if the current dynamic instance of an unresolved branch has not been predicted before. If, in step 10123, the unresolved branch instruction has been predicted previously, the operation of the branch unit 112 returns to step 10121 to wait for the branch instruction to become resolvable. However, if in step 10123 the unresolved branch instruction has not been predicted previously, flow continues to step 10125 wherein the branch unit 112 predicts the outcome of the unresolved branch instruction. The prediction typically involves predicting whether the branch outcome would be taken or fall-through. Dynamic branch prediction techniques are well known in the art and include, for example, branch history tables and/or decode history tables. After predicting the outcome of the unresolved branch in step 10125, flow continues to step 10127 wherein the instruction fetch address stored by the I-fetch unit 108 is updated according to the prediction. In step 10127, if the unresolved branch instruction was predicted to be taken in step 10125, the I-fetch unit 108 is updated with the non-sequential target address of the branch instruction. Otherwise, in step 10127, the I-fetch unit 108 is updated with the next sequential address in the instruction sequence.

If, in step 10121, the branch unit 112 determines the decoded branch instruction is resolvable, flow continues to step 10129 to update the control tags of the entries of the speculative prefetch buffer 126. A more detailed description of step 10129 is described below with respect to FIG. 13. After updating the control tags of the entries of the speculative prefetch buffer 126 in step 10129, operation continues to step 10127 wherein the instruction fetch address stored by the I-fetch unit 108 is updated according to the resolved branch instruction. In step 10127, if the resolved branch instruction was predicted to be taken and was resolved to be taken, normal operation of the computer processing system continues. Similarly, if the resolved branch instruction was predicted to be not-taken and was resolved to be not-taken, normal operation continues. However, if the resolved branch instruction was predicted to be taken and was resolved to be not-taken, the instruction fetch unit 108 is updated to fetch along the sequential (not-taken) path and instructions speculatively executed from the target (taken) path are discarded. Likewise, if the resolved branch instruction was predicted to be not-taken and was resolved to be taken, the instruction fetch unit 108 is updated to fetch along the target (taken) path and instructions speculatively executed from the sequential (not-taken) path are discarded.

Figure 10:
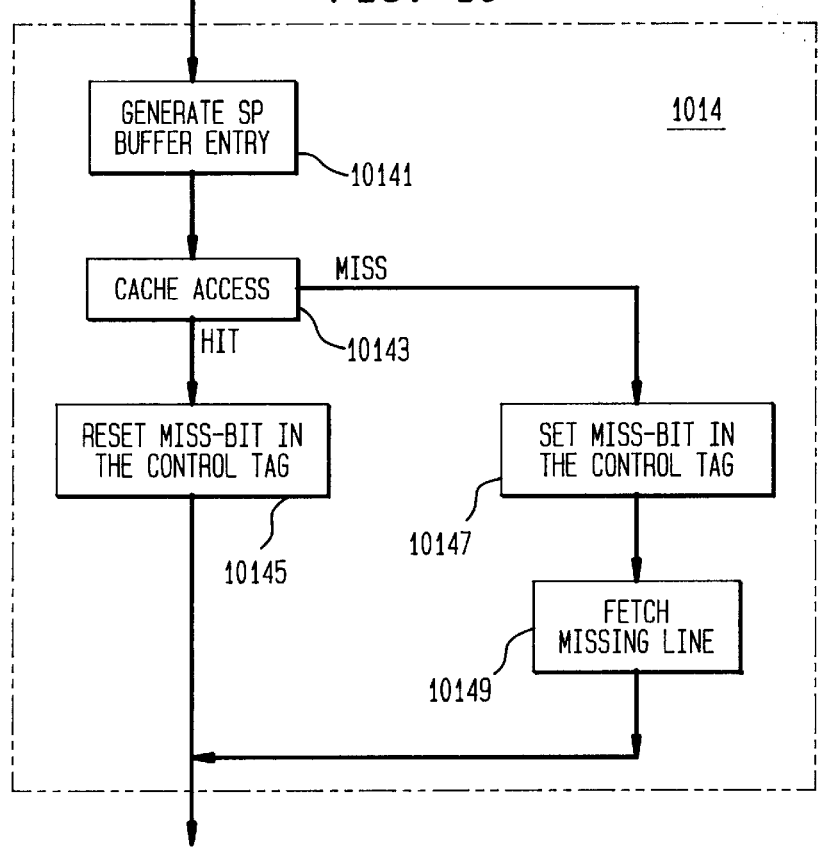
FIG. 10 illustrates the sub-steps associated with the "STOUCH instruction processing" step of FIG. 7.

Returning to FIG. 7, in step 1014, the speculative prefetch control logic 124 processes the instructions decoded as STOUCH instructions by the decode unit 110. A more detailed description of the step 1014 is shown in FIG. 10. More specifically, in step 10141, the speculative prefetch control logic 124 utilizes the information encoded in the STOUCH instruction to create an entry for the specified cache line and loads the entry into the speculative prefetch buffer 126. A more detailed description of the step 10141 is described below with respect to FIG. 14. Subsequent to or in parallel with the generation of the speculative prefetch buffer entry in step 10141, the speculative prefetch control logic 126 in step 10143 accesses the appropriate one of the instruction cache unit 104 and data cache unit 106 using the line address of the STOUCH instruction. In step 10145, if the cache access of step 10143 results in a cache hit (i.e., the line is found in the cache), the miss-bit of the control tag of the associated entry in the speculative prefetch buffer is reset (i.e., set to 0) and the STOUCH instruction processing step 1014 is complete. However, if the cache access of step 10143 results in a cache miss (i.e., the line is not found in the cache), in step 10147 the miss-bit of the control tag of the associated entry in speculative prefetch buffer is set (i.e., set to 1) and flow continues to step 10149 to fetch the missing line of instructions. A more detailed description of the steps in fetching the missing line of instructions into the appropriate cache unit is described below with reference to FIG. 12. After the missing line of instruction has been fetched into the cache in step 10149, the STOUCH instruction processing step 1014 is complete.

Returning back to FIG. 7, in step 1016, the dispatch unit 114 processes other decoded instructions for dispatch to the functional units 116. This processing may include analyzing inter-instruction dependencies to detect an independent subset for simultaneous dispatch, if, for example, the functional units 116 are capable of simultaneously executing more than one instruction.

Figure 11:
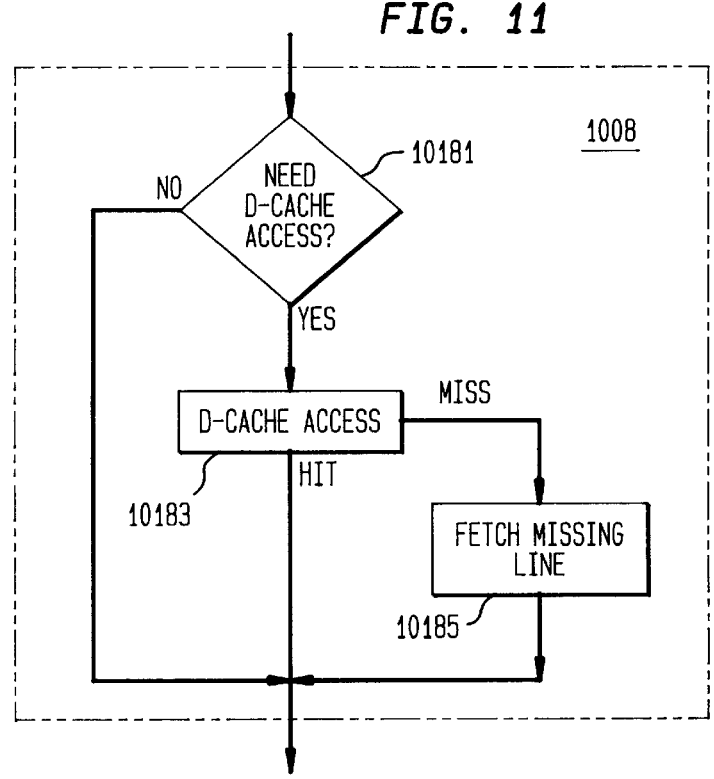
FIG. 11 illustrates the sub-steps associated with the "Execute" step of FIG. 7.

In step 1018, the functional units 116 execute the instructions dispatched by the dispatch unit 114. The execution may involve one or more source operands as inputs, and may create one or more result operands as outputs. The operands are either read from and written into the register file 120 or loaded from and stored into the data cache unit 106. FIG. 11 illustrates the operation in accessing the data cache unit 106. More specifically, in step 10181, the functional unit 116 determines an instruction requires data a cache access (i.e., an input operand is to be retrieved from the data cache unit 106 or an output operand is to be written to the data cache unit 106). If in step 10181 a data cache access is required, the functional unit 116 in step 10183 presents to the D-fetch unit 118 the block address identifying the location in the data cache unit 106 where the operand is to be retrieved/stored, and the D-fetch unit 118 accesses the data cache unit 106 using the supplied block address. If the cache access of step 10143 results in a cache hit (i.e., the block address is found in the data cache unit 106), the data cache access step 1018 is complete. However, if the cache access of step 10183 results in a cache miss (i.e., the block address is not found in the data cache unit 106), flow continues to step 10185 to fetch the missing line of data from the memory 102. A more detailed description of the steps in fetching the missing line of data into the data cache unit 106 is described below with reference to FIG. 12. After the missing line of data has been fetched into the data cache unit 106 in step 10185, the data cache access step 1018 is complete.

Returning to FIG. 7, in step 1020, the completion unit 122 completes instruction execution in an order considered a valid order by the architecture as described above, and processing continues to step 1008 to fetch the next instruction sequence from the instruction cache 104.

The operation of the computer processing system of the present invention as described above includes the steps of fetching a missing line from either the instruction cache unit 104 or the data cache unit 106. Fetching a line missing in the instruction cache unit 104 or data cache unit 106 invariably involves replacing an existing line in the cache unit. According to the present invention, the line replacement algorithm utilized to replace existing lines of the cache is biased to more quickly discard cache lines prefetched with invalid speculations, yet to retain longer the cache lines prefetched with valid speculations.

Figure 12:
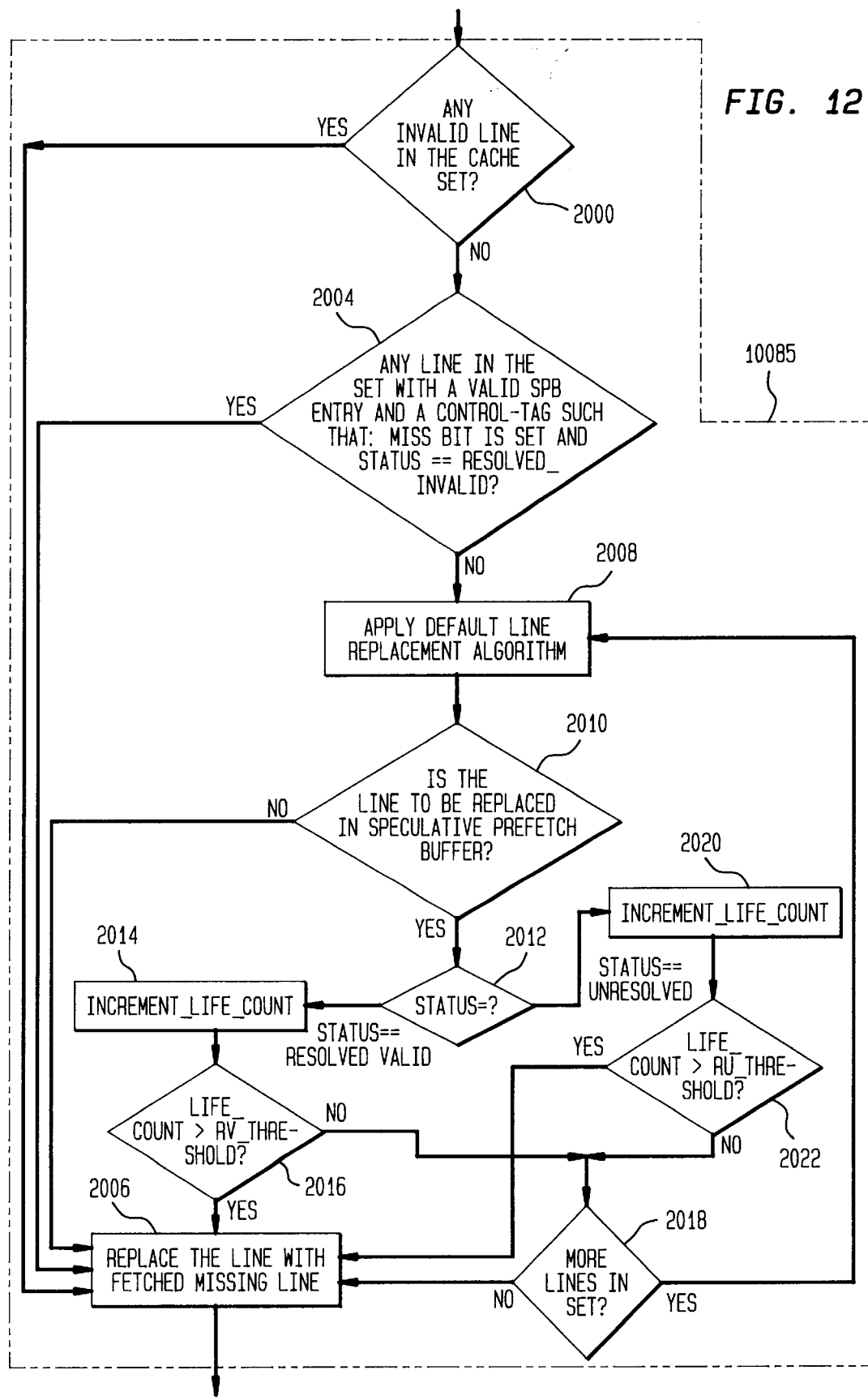
FIG. 12 illustrates the sub-steps associated with the "Fetch missing line" step of FIGS. 8, 10, and 11.

More specifically, as shown in FIG. 12, in fetching a missing line from the memory 102 into the instruction cache unit 104, in step 2000, the I-fetch unit 108 determines if the congruence class or set of the instruction cache unit 104 that corresponds to the line being fetched from memory 102 includes an invalid line (i.e. an existing valid line in the set does not need be replaced to make room for the incoming line). If in step 2000 the I-fetch unit 108 determines that an invalid line exists in the set, the I-fetch unit 108 in step 2006 replaces the invalid line with the fetched missing line and the operation is complete. However, if in step 2000 the I-fetch unit 108 determines that an invalid line does not exist in the set, the speculative prefetch control logic 124 in step 2004 determines if the set corresponding to the line being fetched from memory 102 contains a speculatively prefetched line which is now considered unnecessary. Such a line is identified by examining the control tag of one or more entries of the speculative prefetch buffer 126. Moreover, the speculative prefetch buffer 126 may be set associative. In this case, the line may be identified by examining the control tag of the entries of the speculative prefetch buffer 126 that belong to the same congruence class or set as that of the line being fetched from memory 102.

More specifically, in step 2004, the speculative prefetch control logic 124 analyzes the entries of the speculative prefetch buffer 126 to identify an entry having a control tag that satisfies the following three conditions: the valid bit 400 is set indicating the entry is valid, the miss-bit 402 is set indicating the cache line corresponding to the entry was found missing in the cache prior to its prefetch, and the status field 404 of the entry is set to resolved invalid indicating the cache line corresponding to the entry has been evaluated as an unnecessary prefetch. If in step 2004 an entry of the speculative prefetch buffer 126 is identified that satisfies the three conditions, in step 2006 the I-fetch unit 108 replaces the line in the instruction cache unit 104 that corresponds to the entry identified in step 2004 with the fetched missing line and the fetch missing line operation is complete.

Note that this operation restricts the early discarding of lines with resolved_invalid speculation status to only those lines which were found missing in the cache at the time of prefetch (as indicated by the set miss-bit). Thus, the lines which were found present in the cache at the time of their requested prefetch in response to an STOUCH instruction are not discarded early, as they may be needed by other active portions of the program.

However, if in step 2004 the speculative prefetch control logic 124 determines that there is no unnecessarily prefetched line, in step 2008 the default line replacement algorithm is applied to identify a replacement candidate. For example, the default line replacement algorithm may be a least recently used (LRU) algorithm as is common in the art, or may be other known techniques.

In step 2010, subsequent to or in parallel with step 2008, the speculative prefetch control logic 124 determines if a valid entry exists in the speculative prefetch buffer 126 that corresponds to the replacement candidate identified in step 2008. If there is no such entry, flow continues to step 2006 as described above to replace the replacement candidate line with the fetched missing line. However, in step 2010, if a valid entry exists in the speculative prefetch buffer 126 that corresponds to the replacement candidate, flow continues to step 2012 wherein the speculative prefetch control logic 124 determines if the status field 404 of the control tag 206 of the valid entry is resolved_valid or unresolved. Note that the status of the entry cannot be resolved invalid due to the preceding step 2004.

If in step 2012 the status field 404 is resolved valid, in step 2014 the life count field 410 of the control tag 206 of the entry is incremented, and then in step 2016 the updated life count field 410 is compared with a first threshold value: the resolved valid threshold (RV_Threshold). If in step 2016, the life count field 410 exceeds the first threshold value, flow continues to step 2006 as described above to replace the cache line corresponding to the entry with the fetched missing line. However, if in step 2016 the life count field 410 does not exceed the first threshold value, flow continues to step 2018 to attempt to retain the cache line corresponding to the entry by choosing a different line for replacement, thus providing a bias to the default replacement algorithm.

In step 2018, to attempt to retain the cache line corresponding to the entry, the I-fetch unit determines if there are more lines in the set not yet identified as a replacement candidate in step 2008. If there are more such lines remaining in the set, flow continues to step 2008 to test another replacement candidate in the set. However, if in step 2018, there are no other replacement candidates remaining in the set, flow continues to step 2006 to replace the candidate replacement line with the fetched missing line.

If in step 2012 the status field 404 is unresolved, in step 2020 the life count field 410 of the control tag 206 of the entry is incremented, and then in step 2020 the updated life count field 410 is compared with a second threshold value: the unresolved threshold (U_Threshold). If in step 2022, the life count field 410 exceeds the second threshold value, flow continues to step 2006 as described above to replace the cache line corresponding to the entry with the fetched missing line. However, if in step 2022 the life count field 410 does not exceed the second threshold value, flow continues to step 2018 to attempt to retain the cache line corresponding to the entry by choosing a different line for replacement as described above. The first and second threshold values are specific design-time constants. Higher threshold values imply stronger biasing.

Having described the operation of the I-fetch unit 108 in fetching a missing line into the instruction cache unit 104, the operation of the D-fetch unit 118 in fetching a missing line into the data cache unit 106 is similarly performed.

Figure 13:
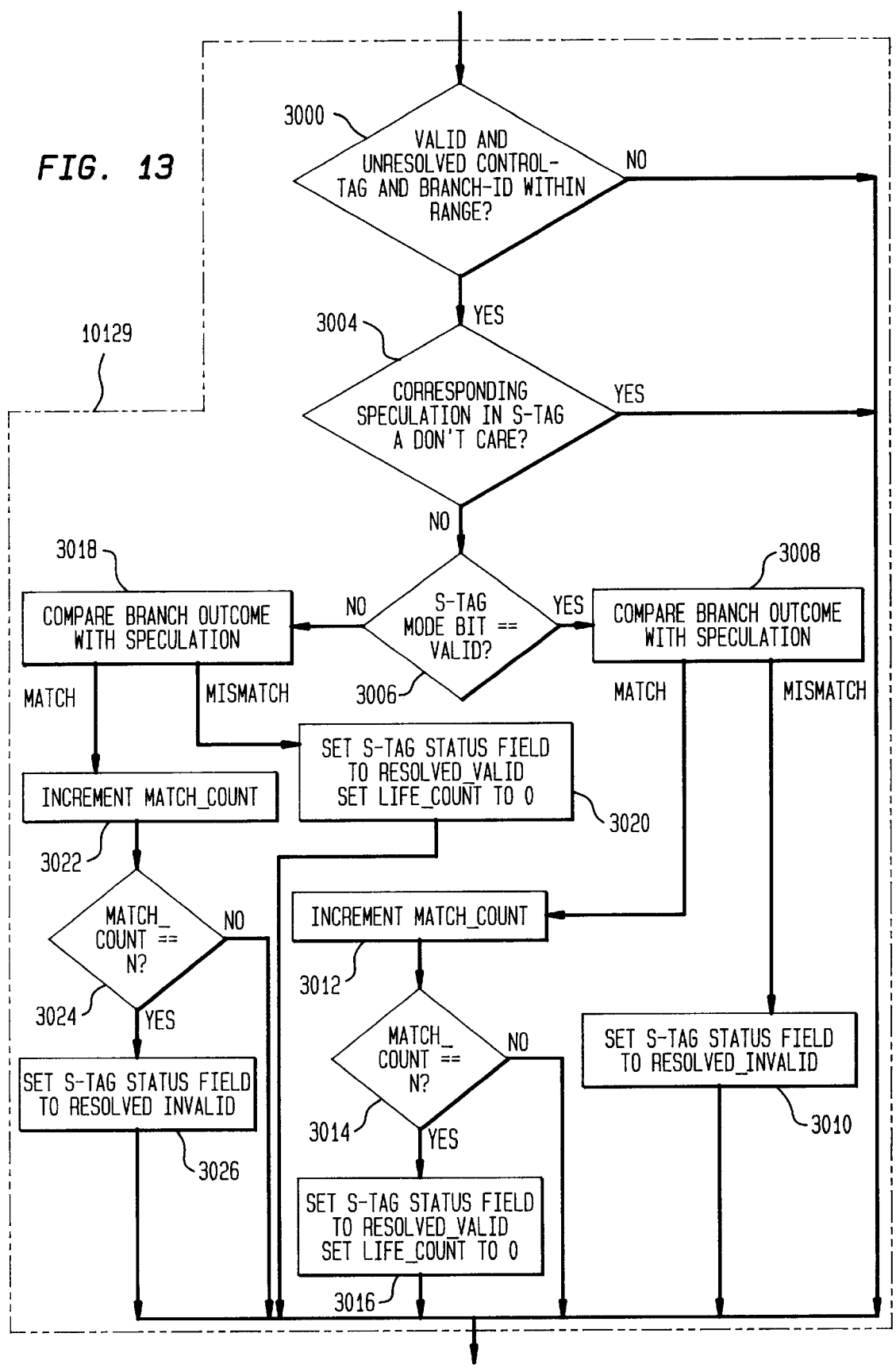
FIG. 13 illustrates the sub-steps associated with the "Update control tag" step of FIG. 9.

The operation of the computer processing system in processing the STOUCH instruction as described above also includes the step 10121 for updating the control tags 206 of entries 200 of the speculative prefetch buffer 126 according to the resolution of branch instructions by the branch unit 112. FIG. 13 describes this step in more detail. More specifically, in step 3000, the speculative prefetch control logic 124 identifies entries 200 of the speculative prefetch buffer 126 which have a control tag 206 with a valid bit 400 that is set and a status field 404 of unresolved. If there are no such entries, the update control tag step 10121 is complete. However, if the speculative prefetch control logic 124 identifies one or more of such entries, these entries are further screened in step 3000 to determine if the branch identifier of the resolved branch instruction is within a range of interest of each entry. The range of interest of a particular entry is defined as beginning at the first branch ID field 406 of the entry and ending after N consecutive branch instructions following the first branch ID field 406.

N is a design and architecture parameter. It is a function of maximum number of branch speculations that can be encoded in the instruction set architecture at compile-time. The branch ID field 406 of the particular entry refers to the ID assigned at run-time to uniquely identify different branch instructions and their different dynamic instances that are simultaneously active at any point during the execution.

In step 3004, for each entry determined to be within the range of interest in step 3000, the speculative prefetch control logic 124 determines if the condition field of the speculation tag 204 of the entry that corresponds to the resolved branch instruction contains a don't care (X) encoding. Since the branch outcomes are assumed to be communicated to the speculative prefetch control unit 124 by the branch unit 112 in STO, the correspondence between successive branch outcomes and the condition fields 302-1 . . . 302-N can be established. If in step 3004 the corresponding condition field contains the don't care encoding, the update control tag step 10121 is complete. However, if the corresponding condition field does not contain a don't care encoding, flow continues to step 3006. Because evaluation of the speculation tag 204 of the entries is dependent on the setting of the mode-bit 304, in step 3006 the speculative prefetch control logic determines whether the mode bit 304 of the speculation tag 204 of the entry is set to valid or invalid.

If in step 3006 the mode bit 304 of the entry is set to valid, in step 3008 the speculative prefetch control logic 124 compares the branch outcome with the corresponding condition field of the speculation tag 204 of the entry to determine whether there is a match or a mismatch. If there is a mismatch, in step 3010 the speculative prefetch control logic 124 updates the status field 404 of the control tag 206 of the entry to resolved invalid. If in step 3008 there is a match, in step 3012 the speculative prefetch control logic 124 increments the match count field 408 of the control tag 206 of the entry and in step 3014 determines if the updated match count field 408 has reached the value N, thus indicating that the speculation tag evaluation is complete. If in step 3014 the match count field 408 has not reached the value N, the update control tag step 10121 is complete. However, if in step 3014 the match count field 408 has reached the value N, flow continues to step 3016 wherein the speculative prefetch control logic 124 updates the status field 404 of the control tag 206 of the entry to resolved valid and initializes the life count field 410 of the entry, for example, by setting it to zero.

If in step 3006 the mode bit 304 of the entry is set to invalid, in step 3018 the speculative prefetch control logic 124 compares the branch outcome with the corresponding condition field of the speculation tag 204 of the entry to determine whether there is a match or a mismatch. If there is a mismatch, in step 3020 the speculative prefetch control logic 124 updates the status field 404 of the control tag 206 of the entry to resolved valid and initializes the life count field 410 of the entry, for example, by setting it to zero. If in step 3018 there is a match, in step 3022 the speculative prefetch control logic 124 increments the match count field 408 of the control tag 206 of the entry and in step 3024 determines if the updated match count field 408 has reached the value N, thus indicating that the speculation tag evaluation is complete. If in step 3024 the match count field 408 has not reached the value N, the update control tag step 10121 is complete. However, if in step 3014 the match count field 408 has reached the value N, flow continues to step 3026 wherein the speculative prefetch control logic 124 updates the status field 404 of the control tag 206 of the entry to resolved invalid.

Figure 14:
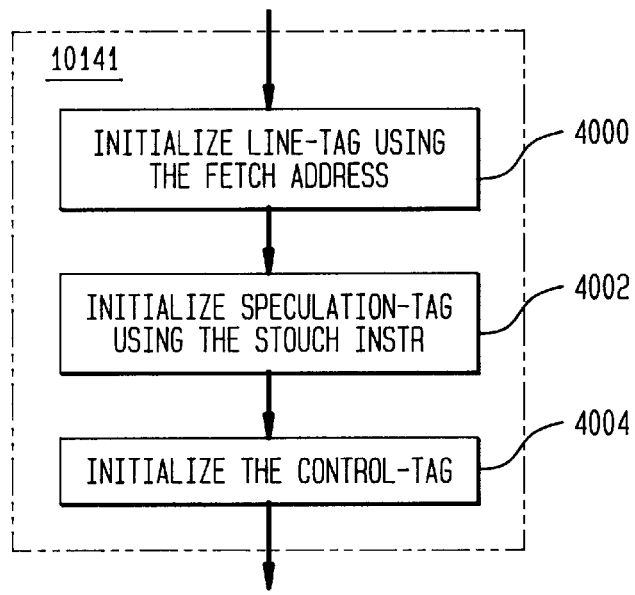
FIG. 14 illustrates the sub-steps associated with the "Generate SP Buffer entry" step of FIG. 10.
Figure 15:
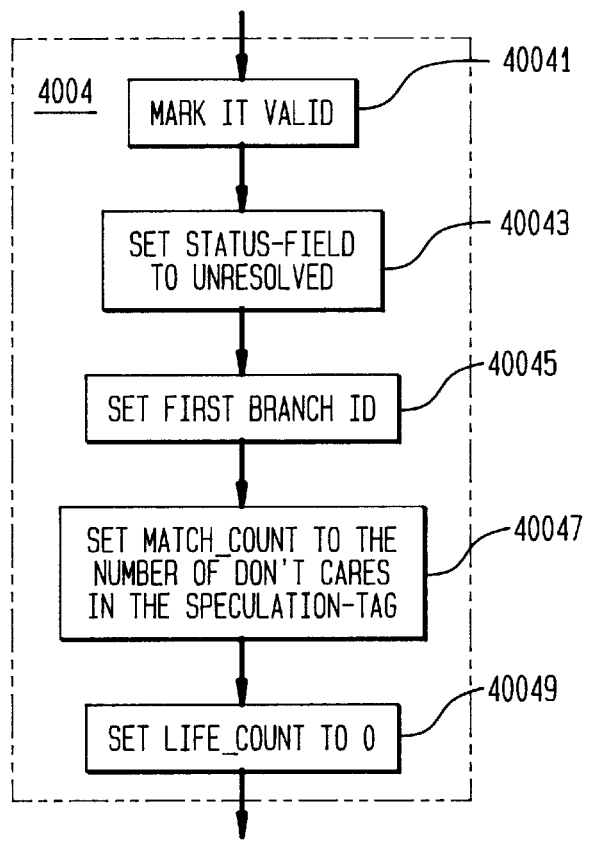
FIG. 15 illustrates the sub-steps associated with the "Initialize Control Tag" step of FIG. 14.

The operation of the computer processing system in processing the STOUCH instruction as described above also includes the step 10141 for creating an entry in the speculative prefetch buffer 126 according to the information encoded in the STOUCH instruction. FIG. 14 describes this step in more detail. More specifically, in step 4000, the speculative prefetch control unit 124 initializes the line-tag field 202 of the entry using the prefetch address of the line, preferably establishing a one-to-one correspondence with an entry in the instruction or data cache unit 104,106. In step 4002, the speculative prefetch control logic 124 initializes the speculation tag field 204 of the entry 200 using the information contained in the STOUCH instruction. The mode-bit 304 is initialized to the same value as that in the mode-bit associated with the STOUCH instruction. And the sub-fields <cond_1> . . . <cond_N> of the STOUCH instruction are used to initialize the branch speculation fields 302-1 . . . 302-N of the speculation tag 204 of the entry. Finally, in step 4004, the speculative prefetch control logic 124 initializes the control tag as illustrated in FIG. 15.

More specifically, in step 40041, the speculative prefetch control logic 124 sets the valid bit 400 of the control tag 206. In step 40043, the speculative prefetch control logic 124 initializes the status field 404 of the control tag 206 to unresolved. In step 40045, the speculative prefetch control logic 124 sets the first branch ID field 406 of the control tag 206 to the identifier of the first branch instruction in the STO after the associated STOUCH instruction. Since the branch identifiers are typically assigned in sequence, the identifier of the latest dynamic branch instance encountered prior to STOUCH can be used to generate the First Branch ID field 406. In step 40047, the speculative prefetch control logic 124 initializes the match count field 408 of the control tag 206 to the number of don't cares encoded in the speculation tag 204. Finally, in step 40049, the speculative prefetch control logic 124 initializes the life count field 410 of the control tag 206, for example, by setting it to 0.

Alternative Embodiment of the Present Invention

In most prior-art computing engines, instructions that can potentially set the condition codes in the condition register always destroy any previous information. However, there are some prior-art architectures, e.g., the PowerPC architecture (PowerPC is a trademark of the International Business Machines, Corp.) which allow multiple updates of the condition register without completely overwriting the previous contents of the register. In other words, on such architectures the condition register updates to different non-overlapping portions of the register can be executed simultaneously without any interference. The alternate embodiment of the present invention described below is applicable primarily to the computing engines based on the latter type of architectures.

In the alternative embodiment, compile-time speculations <cond_1> through <cond_N> of the STOUCH instruction as described above are associated directly with different condition register bits. Consequently, the control-flow speculation now speculates on the true or false settings of a set of condition register bits, preferably, a consecutive sequence of condition register bits. At run time, the speculated settings of condition register bits are compared against the actual settings of the corresponding condition register bits at the end of the dependence region of the STOUCH instruction, to determine the validity of the compile-time speculation. This is similar to taken or not-taken assumption for the corresponding branches associated with the condition bit comparisons. Note that under this embodiment, unlike the previous embodiment, the dynamic order of the speculated branches becomes irrelevant, and the specified condition register bits can be set in any order at run time. Also note that it should now be possible to restrict the compile-time condition encoding to true and false. Therefore, a single condition register bit would be good enough for encoding a speculation. There is no need now to encode the don't care branch outcomes. The branches whose outcomes are immaterial for the prefetched cache line, can be made to use the condition register bits other than those used by <cond_1> through <cond_N> of the STOUCH instruction.

It is assumed that the compile-time speculations refer to a set of N consecutive condition register bits. The location of the first speculated condition register bit could either be fixed or specified as part of the condition field encoding. Similarly, the number of bits being speculated could either be fixed to N or specified as part of the condition field encoding of the STOUCH instruction. In case a fixed number of bits have to be speculated upon, the unused bits can be set at compile-time such that they do not impact the speculation. It is further assumed that the compile-time inserted instructions which set the unused condition register bits are in the dependence region of the STOUCH instruction, so that their updates are properly recorded in evaluating the speculation tag at run time. The discussion below assumes that the compile-time speculations are encoded using a fixed number (N) of the CR bits starting at a location specified in the STOUCH instruction.

According to the alternate embodiment of the present invention, the computing apparatus of FIG. 3 and the execution methodology illustrated in FIGS. 7 through 15 may be modified as described below. Moreover, branch speculations referred to in the preceding discussion now refer to speculation on condition register bits.

More specifically, the branch unit 112 of FIG. 3 may be modified to transfer information on condition register updates to the speculative prefetch control unit 124 instead of branch outcomes. In other words, every condition register update is communicated to the speculative prefetch control unit 124 in terms of which bit/bits is/are being updated and with what new content.

Furthermore, the first branch ID field 406 of the control tag 206 of the entries stored in the speculative prefetch buffer 126 is renamed as the first CR bit ID field and contains the location of the first condition register bit being speculated in the associated STOUCH instruction.

Figure 16:
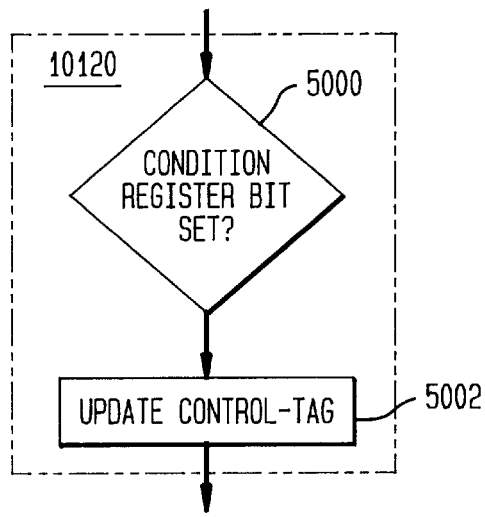
FIG. 16 illustrates the sub-steps associated with the "Branch and CR instruction processing" step of FIG. 7 in an alternate embodiment of the present invention.

The execution methodology as described above is modified as follows. There is no special processing needed for branch instructions. However, condition register bit settings may involve control tag updates. Therefore, the Branch and CR instruction processing step 1012 of FIGS. 7 and 9 is replaced the methodology illustrated in step 10120 in FIG. 16. More specifically, in step 5000, the branch unit 112 determines if a condition register bit is being updated and transmits any such update to the speculative prefetch control logic 204. In step 5002, in response to updates of one or more condition register bits, the speculative prefetch control logic carries out potential updates of one or more control tags 206 of the entries of the speculative prefetch buffer 126. Step 5002 is same as the steps described in FIG. 13, except for the following changes. Step 3000 of FIG. 13 is modified to check for CR Bit ID within range instead of checking for the Branch ID within range. The range is defined as starting at the First CR Bit ID and consisting of N consecutive CR Bit IDs. And step 3008 and 3018 of FIG. 13 are modified to compare CR bit outcome with the corresponding speculation tag instead of comparing the branch outcome to the corresponding speculation tag.

As described above, the line address and speculation tags of the entries of the speculative prefetch buffer 200 are derived from compile-time information. However, machines capable of hardware prefetch and speculative execution may generate these entries from run-time information.

Other embodiments of the invention will be apparent to those skilled in the art from consideration of the specification and practice of the invention disclosed herein. It is intended that the specification and examples be considered as examples only, with the true scope of the invention being indicated by the claims.

I claim:

1. In a computer processing system wherein sequences of instructions stored in a main memory are loaded into lines of an instruction cache, and transferred from said instruction cache to a processing unit for execution, wherein a line replacement algorithm is utilized to overwrite said lines of said instruction cache, a method of controlling the fetching of instructions from the main memory to the instruction cache comprising the steps of:

if one of said instructions transferred from said instruction cache to said processing unit is an STOUCH instruction, fetching one or more instructions identified by said STOUCH instruction from said main memory into one or more lines of said instruction cache, wherein said one or more instructions may be executed by said processing unit;

resolving one or more speculations associated with said STOUCH instruction, if each of said speculations is resolved to be valid, biasing said line replacement algorithm such that said one or more lines of said instruction cache containing said one or more instructions identified by said STOUCH instruction are retained for a greater number of machine cycles than during normal operation of said line replacement algorithm, and if any of said speculations is resolved to be invalid, biasing said line replacement algorithm such that said one or more lines of said instruction cache containing said one or more instructions identified by said STOUCH instruction are retained for a shorter number of machine cycles than during normal operation of said line replacement algorithm.

2. The method of claim 1, further comprising the step of:

if one or more of said speculations is yet to be resolved, biasing said line replacement algorithm such that said one or more lines of said instruction cache containing said one or more instructions identified by said STOUCH instruction are retained for a greater number of machine cycles than during normal operation of said line replacement algorithm.

3. The method of claim 1, wherein said STOUCH instruction includes:

an op-code field that identifies said STOUCH instruction from other instructions of said sequences of instructions stored in said main memory;

an address field that points to an address within said main memory of said one or more instructions identified by said STOUCH instruction; and a condition field that specifies said one or more speculations.

4. The method of claim 3, wherein said STOUCH instruction includes a mode field that is used to interpret said condition fields.

5. The method of claim 4, wherein said mode field may be one of a first value and a second value, wherein, if said mode field has said first value, said speculations are resolved valid only if each of said speculations specified by said condition field are determined to be true, and wherein, if said mode field has said second value, said speculations are resolved valid only if one or more of said speculations specified by said condition field are determined to be false.

6. The method of claim 3, wherein said STOUCH instruction comprises 32 bits, a first portion being bits 0–5, a second portion being bits 6–10, a third portion being bits 11–15, a fourth portion being bits 16–20, a fifth portion being bits 21–30, and a sixth portion being bit 31.

7. The method of claim 6, wherein said first portion comprises said op-code field.

8. The method of claim 6, wherein said third and fourth portions comprise said address field.

9. The method of claim 6, wherein said second portion comprises said condition field.

10. The method of claim 6, wherein bit 6 of said second portion comprises said mode field.

11. The method of claim 1, wherein each of said speculations comprise a speculative outcome of a branch instruction that follows said STOUCH instruction.

12. The method of claim 11, wherein the step of resolving one or more speculations associated with said STOUCH instruction includes the steps of:

initially setting a resolution status flag associated with said STOUCH instruction to a value indicating said speculations identified by said STOUCH instruction are not yet resolved;

for each speculative branch outcome identified by said STOUCH instruction, comparing said speculative branch outcome to a branch resolution output from said processing unit, if said speculative branch outcome does not match said branch resolution, setting said status flag associated with said STOUCH instruction to a value indicating said speculations identified by said STOUCH instruction are resolved invalid, and if each speculative branch outcome matches the corresponding branch resolution output from said processing unit, setting said resolution status flag associated with said STOUCH instruction to a value indicating said speculations identified by said STOUCH instruction are resolved valid.

13. The method of claim 1, wherein each of said speculations comprise a speculative state of a condition register field upon completing an instruction that follows said STOUCH instruction.

14. The method of claim 13, wherein the step of resolving one or more speculations associated with said STOUCH instruction includes the steps of:

initially setting a resolution status flag associated with said STOUCH instruction to a value indicating said speculations identified by said STOUCH instruction are not yet resolved;

for each speculative state of said condition register field identified by said STOUCH instruction, comparing said speculative state to an actual state of said condition register field, if said speculative state of said condition register field does not match said actual state of said condition register field, setting said status flag associated with said STOUCH instruction to a value indicating said speculations identified by said STOUCH instruction are resolved invalid, and if each speculative state of said condition register field matches the corresponding actual state of said condition register field, setting said resolution status flag associated with said STOUCH instruction to a value indicating said speculations identified by said STOUCH instruction are resolved valid.

15. The method of claim 1, wherein said instruction cache is divided into sets associated with one or more lines, and wherein the step of biasing said line replacement algorithm such that said one or more lines of said instruction cache containing said one or more instructions identified by said STOUCH instruction are retained for a greater number of machine cycles than during normal operation of said line replacement algorithm includes the steps of:

fetching a missing line from said main memory that is to be stored in said instruction cache;

applying said line replacement algorithm to identify a line of said instruction cache recommended for replacement, wherein said line recommended for replacement is within the set associated with said missing line;

if said line recommended for replacement contains an instruction identified by said STOUCH instruction and said speculations associated with said STOUCH instruction are resolved valid, incrementing a life counter associated with said line, wherein said life counter indicates a number of times said line has previously been recommended for replacement, if said life counter is greater than a predetermined first threshold value, replacing said line with a fetched missing line, and if said life counter is not greater than said predetermined first threshold value, returning to the step above of applying said line replacement algorithm for a subset of the set of lines associated with said line, wherein said subset excludes said line, unless if said subset is null, replacing said line with said fetched missing line.

16. The method of claim 2, wherein said instruction cache is divided into sets associated with one or more lines, and wherein the step of biasing said line replacement algorithm such that said one or more lines of said instruction cache containing said one or more instructions identified by said STOUCH instruction are retained for a greater number of machine cycles than during normal operation of said line replacement algorithm includes the steps of:

fetching a missing line from said main memory that is to be stored in said instruction cache;

applying said line replacement algorithm to identify a line of said instruction cache recommended for replacement, wherein said line recommended for replacement is within the set associated with said missing line;

if said line recommended for replacement contains an instruction identified by said STOUCH instruction and said speculations associated with said STOUCH instruction are not yet resolved, incrementing a life counter associated with said line, wherein said life counter indicates a number of times said line has previously been recommended for replacement, if said life counter is greater than a predetermined second threshold value, replacing said line with a fetched missing line, and if said life counter is not greater than said predetermined second threshold value, returning to the step above of applying said line replacement algorithm for a subset of the set of lines associated with said line, wherein said subset excludes said line, unless if said subset is null, replacing said line with said fetched missing line.

17. The method of claim 1, further comprising the step of:

upon fetching said one or more instructions identified by said STOUCH instruction from said main memory into one or more lines of said instruction cache, setting a miss bit associated with each of said one or more lines of said instruction cache;

wherein the step of biasing said line replacement algorithm such that said one or more lines of said instruction cache containing said one or more instructions identified by said STOUCH instruction are retained for a shorter number of machine cycles than during normal operation of said line replacement algorithm includes the steps of:

fetching a missing line from said main memory that is to be stored in said instruction cache;

identifying a particular line within the set associated with said missing line whose associated miss bit is set and that contains an instruction identified by said STOUCH instruction, wherein said speculations associated with said STOUCH instruction are resolved invalid; and replacing said particular line with said fetched missing line.

18. The method of claim 1, wherein said STOUCH instruction is inserted into said sequences of instructions at compile-time.

19. In a computer processing system wherein data associated with one or more instructions is stored in a main memory, loaded into lines of a data cache, and transferred from said data cache to a processing unit for execution, wherein a line replacement algorithm is utilized to overwrite said lines of said data cache, a method of controlling the fetching of data from the main memory to the data cache comprising the steps of:

if an instruction loaded into said processing unit for execution is an STOUCH instruction, fetching data identified by said STOUCH instruction from said main memory into one or more lines of said data cache;

resolving one or more speculations associated with said STOUCH instruction, if each of said speculations is resolved to be valid, biasing said line replacement algorithm such that said one or more lines of said data cache containing said data identified by said STOUCH instruction are retained for a greater number of machine cycles than during normal operation of said line replacement algorithm, and if any of said speculations is resolved to be invalid, biasing said line replacement algorithm such that said one or more lines of said data cache containing said data identified by said STOUCH instruction are retained for a shorter number of machine cycles than during normal operation of said line replacement algorithm.

20. The method of claim 19, further comprising the step of:

if one or more of said speculations is yet to be resolved, biasing said line replacement algorithm such that said one or more lines of said data cache containing said data identified by said STOUCH instruction are retained for a greater number of machine cycles than during normal operation of said line replacement algorithm.

21. The method of claim 19, wherein said STOUCH instruction includes:

an op-code field that identifies said STOUCH instruction from other instructions of said sequences of instructions stored in said main memory;

an address field that points to an address within said main memory of said data identified by said STOUCH instruction; and a condition field that specifies said one or more speculations.

22. The method of claim 21, wherein said STOUCH instruction includes a mode field that is used to interpret said condition fields.

23. The method of claim 22, wherein said mode field may be one of a first value and a second value, wherein, if said mode field has said first value, said speculations are resolved valid only if each of said speculations specified by said condition field are determined to be true, and wherein, if said mode field has said second value, said speculations are resolved valid only if one or more of said speculations specified by said condition field are determined to be false.

24. The method of claim 21, wherein said STOUCH instruction comprises 32 bits, a first portion being bits 0–5, a second portion being bits 6–10, a third portion being bits 11–15, a fourth portion being bits 16–20, a fifth portion being bits 21–30, and a sixth portion being bit 31.

25. The method of claim 24, wherein said first portion comprises said op-code field.

26. The method of claim 24, wherein said third and fourth portions comprise said address field.

27. The method of claim 24, wherein said second portion comprises said condition field.

28. The method of claim 24, wherein bit 6 of said second portion comprises said mode field.

29. The method of claim 19, wherein each of said speculations comprise a speculative outcome of a branch instruction that follows said STOUCH instruction.

30. The method of claim 29, wherein the step of resolving one or more speculations associated with said STOUCH instruction includes the steps of:

initially setting a resolution status flag associated with said STOUCH instruction to a value indicating said speculations associated with said data identified by said STOUCH instruction are not yet resolved;

for each speculative branch outcome identified by said STOUCH instruction, comparing said speculative branch outcome to a branch resolution output from said processing unit, if said speculative branch outcome does not match said branch resolution, setting said status flag associated with said STOUCH instruction to a value indicating said speculations identified by said STOUCH instruction are resolved invalid, and if each speculative branch outcome matches the corresponding branch resolution output from said processing unit, setting said resolution status flag associated with said STOUCH instruction to a value indicating said speculations identified by said STOUCH instruction are resolved valid.

31. The method of claim 19, wherein each of said speculations comprise a speculative state of a condition register field upon completing an instruction that follows said STOUCH instruction.

32. The method of claim 31, wherein the step of resolving one or more speculations associated with said STOUCH instruction includes the steps of:

initially setting a resolution status flag associated with said STOUCH instruction to a value indicating said speculations identified by said STOUCH instruction are not yet resolved;

for each speculative state of said condition register field identified by said STOUCH instruction, comparing said speculative state to an actual state of said condition register field, if said speculative state of said condition register field does not match said actual state of said condition register field, setting said status flag associated with said STOUCH instruction to a value indicating said speculations identified by said STOUCH instruction are resolved invalid, and if each speculative state of said condition register field matches the corresponding actual state of said condition register field, setting said resolution status flag associated with said STOUCH instruction to a value indicating said speculations identified by said STOUCH instruction are resolved valid.

33. The method of claim 19, wherein said data cache is divided into sets associated with one or more lines, and wherein the step of biasing said line replacement algorithm such that said one or more lines of said data cache containing said data identified by said STOUCH instruction are retained for a greater number of machine cycles than during normal operation of said line replacement algorithm includes the steps of:

fetching a missing line from said main memory that is to be stored in said data cache;

applying said line replacement algorithm to identify a line of said data cache recommended for replacement, wherein said line recommended for replacement is within the set associated with said missing line;

if said line recommended for replacement contains data identified by said STOUCH instruction and said speculations associated with said STOUCH instruction are resolved valid, incrementing a life counter associated with said line, wherein said life counter indicates a number of times said line has previously been recommended for replacement, if said life counter is greater than a predetermined first threshold value, replacing said line with a fetched missing line, and if said life counter is not greater than said predetermined first threshold value, returning to the step above of applying said line replacement algorithm for a subset of the set of lines associated with said line, wherein said subset excludes said line, unless if said subset is null, replacing said line with said fetched missing line.

34. The method of claim 20, wherein said data cache is divided into sets associated with one or more lines, and wherein the step of biasing said line replacement algorithm such that said one or more lines of said data cache containing said data identified by said STOUCH instruction are retained for a greater number of machine cycles than during normal operation of said line replacement algorithm includes the steps of:

fetching a missing line from said main memory that is to be stored in said data cache;

applying said line replacement algorithm to identify a line of said data cache recommended for replacement, wherein said line recommended for replacement is within the set associated with said missing line;

if said line recommended for replacement contains data identified by said STOUCH instruction and said speculations associated with said STOUCH instruction are not yet resolved, incrementing a life counter associated with said line, wherein said life counter indicates a number of times said line has previously been recommended for replacement, if said life counter is greater than a predetermined second threshold value, replacing said line with a fetched missing line, and if said life counter is not greater than said predetermined second threshold value, returning to the step above of applying said line replacement algorithm for a subset of the set of lines associated with said line, wherein said subset excludes said line, unless if said subset is null, replacing said line with said fetched missing line.

35. The method of claim 19, further comprising the step of:

upon fetching said one or more instructions identified by said STOUCH instruction from said main memory into one or more lines of said data cache, setting a miss bit associated with each of said one or more lines of said data cache;

wherein the step of biasing said line replacement algorithm such that said one or more lines of said data cache containing said data identified by said STOUCH instruction are retained for a shorter number of machine cycles than during normal operation of said line replacement algorithm includes the steps of:

fetching a missing line from said main memory that is to be stored in said data cache;

identifying a particular line within the set associated with said missing line whose associated miss bit is set and that contains data identified by said STOUCH instruction, wherein said speculations associated with said STOUCH instruction are resolved invalid; and replacing said particular line with said fetched missing line.

36. The method of claim 19, wherein said STOUCH instruction is inserted into said sequences of instructions at compile-time.

37. A data processing system comprising:

main memory for storing sequences of instructions and data values associated with said instructions;

an instruction cache, coupled to said main memory, having lines each storing one or more instructions to be executed by a processing unit, wherein a line replacement algorithm is utilized to overwrite said lines of said instruction cache, an instruction fetch unit for fetching one or more instructions from said main memory into said instruction cache;

means for recognizing an STOUCH instruction from other instructions loaded into said processing unit for execution, and, upon recognizing said STOUCH instruction, for controlling said instruction fetch unit to fetch one or more instructions identified by said STOUCH instruction from said main memory into one or more lines of said instruction cache, wherein said one or more instructions may be executed by said processing unit; and STOUCH evaluation logic that resolves one or more speculations associated with said STOUCH instruction, wherein if each of said speculations is resolved to be valid, said STOUCH evaluation logic biases said line replacement algorithm such that said one or more lines of said instruction cache containing said one or more instructions identified by said STOUCH instruction are retained for a greater number of machine cycles than during normal operation of said line replacement algorithm, and if any of said speculations is resolved to be invalid, said STOUCH evaluation logic biases said line replacement algorithm such that said one or more lines of said instruction cache containing said one or more instructions identified by said STOUCH instruction are retained for a shorter number of machine cycles than during normal operation of said line replacement algorithm.

38. The data processing system of claim 37, wherein if one or more of said speculations is yet to be resolved, said STOUCH evaluation logic biases said line replacement algorithm such that said one or more lines of said instruction cache containing said one or more instructions identified by said STOUCH instruction are retained for a greater number of machine cycles than during normal operation of said line replacement algorithm.

39. The data processing system of claim 37, wherein said STOUCH instruction includes:

an op-code field that identifies said STOUCH instruction from other instructions of said sequences of instructions stored in said main memory;

an address field that points to an address within said main memory of said one or more instructions identified by said STOUCH instruction; and a condition field that specifies said one or more speculations.

40. The data processing system of claim 39, wherein said STOUCH evaluation logic includes a buffer for storing an entry corresponding to said STOUCH instruction, wherein said entry is utilized by said STOUCH evaluation logic to evaluate said STOUCH instruction, said entry including at least a line tag and a speculation tag, wherein said line tag points to one or more lines of said instruction cache that contain said one or more instructions identified by said address field of said STOUCH instruction, and wherein said speculation tag specifies said speculations specified by said condition field of said STOUCH instruction.

41. The data processing system of claim 40, wherein said speculation tag includes a mode bit that is used by said STOUCH evaluation logic to interpret said speculations encoded by said speculation tag.

42. The data processing system of claim 41, wherein said mode bit may be one of a first value and a second value,
wherein, if said mode bit has said first value, said STOUCH evaluation logic resolves said speculations as valid only if each of said speculations specified by said condition field are determined to be true, and
wherein, if said mode field has said second value, said STOUCH evaluation logic resolves said speculations as valid only if on or more of said speculations specified by said condition field are determined to be false.

43. The data processing system of claim 40, wherein each of said speculations comprise a speculative outcome of a branch instruction that follows said STOUCH instruction.

44. The data processing system of claim 43, wherein said entry of said buffer corresponding to said STOUCH instruction comprises a control tag that includes at least a resolution status field, wherein said resolution status field indicates whether the speculations encoded by said speculation tag of said entry are one of: not yet resolved, resolved valid, and resolved invalid.

45. The data processing system of claim 44, wherein said STOUCH evaluation logic includes control logic that
initially sets said resolution status field of said entry stored in said buffer that is associated with said STOUCH instruction to a value indicating said speculations encoded by said speculation tag of said entry are not yet resolved,
for each speculative branch outcome identified by said STOUCH instruction, compares said speculative branch outcome to a branch resolution output from said processing unit,
if said speculative branch outcome does not match said branch resolution, sets said resolution status field of said control tag of said entry to a value indicating said speculations encoded by said speculation tag of said entry are resolved invalid, and
if each speculative branch outcome matches the corresponding branch resolution output from said processing unit, sets said resolution status field of said control tag of said entry to a value indicating said speculations encoded by speculation tag of said entry are resolved valid.

46. The data processing system of claim 40, wherein each of said speculations comprise a speculative state of a condition register field upon completing an instruction that follows said STOUCH instruction.

47. The data processing system of claim 46, wherein said entry of said buffer corresponding to said STOUCH instruction comprises a control tag that includes at least a resolution status field, wherein said resolution status field indicates whether the speculations encoded by said speculation tag of said entry are one of: not yet resolved, resolved valid, and resolved invalid.

48. The data processing system of claim 47, wherein said STOUCH evaluation logic includes control logic that
initially sets said resolution status field of said entry associated with said STOUCH instruction to a value indicating said speculations encoded by said speculation tag of said entry are not yet resolved;
for each speculative state of said condition register field encoded by said speculation tag of said entry, compares said speculative state to an actual state of said condition register field,
if said speculative state does not match said actual state of said condition register field, sets said resolution status field of said control tag of said entry to a value indicating said speculations encoded by said speculation tag of said entry are resolved invalid, and
if each speculative state matches the corresponding actual state of said condition register field, sets said resolution status field of said control tag of said entry to a value indicating said speculations encoded by said speculation tag of said entry are resolved valid.

49. The data processing system of claim 37, wherein said STOUCH instruction is inserted into said sequences of instructions at compile-time.

50. A data processing system comprising:
main memory for storing sequences of instructions and data values associated with said instructions;
a data cache, coupled to said main memory, having lines each storing one or more data values utilized by a processing unit in executing said instructions stored in said main memory, wherein a line replacement algorithm is utilized to overwrite said lines of said data cache,
a data fetch unit for fetching data values from said main memory into said data cache;
means for recognizing an STOUCH instruction from other instructions loaded into said processing unit for execution, and, upon recognizing said STOUCH instruction, for controlling said data fetch unit to fetch one or more data values identified by said STOUCH instruction from said main memory into one or more lines of said data cache;
STOUCH evaluation logic that resolves one or more speculations associated with said STOUCH instruction, wherein
if each of said speculations is resolved to be valid, said STOUCH evaluation logic biases said line replacement algorithm such that said one or more lines of said data cache containing said one or more data values identified by said STOUCH instruction are retained for a greater number of machine cycles than during normal operation of said line replacement algorithm, and
if any of said speculations is resolved to be invalid, said STOUCH evaluation logic biases said line replacement algorithm such that said one or more lines of said data cache containing said one or more data values identified by said STOUCH instruction are retained for a shorter number of machine cycles than during normal operation of said line replacement algorithm.

51. The data processing system of claim 50, wherein if one or more of said speculations is yet to be resolved, said STOUCH evaluation logic biases said line replacement algorithm such that said one or more lines of said data cache containing said one or more data values identified by said STOUCH instruction are retained for a greater number of machine cycles than during normal operation of said line replacement algorithm.

52. The data processing system of claim 50, wherein said STOUCH instruction includes:

an op-code field that identifies said STOUCH instruction from other instructions of said sequences of instructions stored in said main memory;

an address field that points to an address within said main memory of said one or more data values identified by said STOUCH instruction; and a condition field that specifies said one or more speculations.

53. The data processing system of claim 52, wherein said STOUCH evaluation logic includes a buffer for storing an entry corresponding to said STOUCH instruction, wherein said entry is utilized by said STOUCH evaluation logic to evaluate said STOUCH instruction, said entry including at least a line tag and a speculation tag, wherein said line tag points to one or more lines of said data cache that contain said one or more data values identified by said address field of said STOUCH instruction, and wherein said speculation tag specifies said speculations specified by said condition field of said STOUCH instruction.

54. The data processing system of claim 53, wherein said speculation tag includes a mode bit that is used by said STOUCH evaluation logic to interpret said speculations encoded by said speculation tag.

55. The data processing system of claim 54, wherein said mode bit may be one of a first value and a second value, wherein, if said mode bit has said first value, said STOUCH evaluation logic resolves said speculations as valid only if each of said speculations specified by said condition field are determined to be true, and wherein, if said mode field has said second value, said STOUCH evaluation logic resolves said speculations as valid only if on or more of said speculations specified by said condition field are determined to be false.

56. The data processing system of claim 53, wherein each of said speculations comprise a speculative outcome of a branch instruction that follows said STOUCH instruction.

57. The data processing system of claim 56, wherein said entry of said buffer corresponding to said STOUCH instruction comprises a control tag that includes at least a resolution status field, wherein said resolution status field indicates whether the speculations encoded by said speculation tag of said entry are one of: not yet resolved, resolved valid, and resolved invalid.

58. The data processing system of claim 57, wherein said STOUCH evaluation logic includes control logic that initially sets said resolution status field of said entry stored in said buffer that is associated with said STOUCH instruction to a value indicating said speculations encoded by said speculation tag of said entry are not yet resolved, for each speculative branch outcome identified by said STOUCH instruction, compares said speculative branch outcome to a branch resolution output from said processing unit, if said speculative branch outcome does not match said branch resolution, sets said resolution status field of said control tag of said entry to a value indicating said speculations encoded by said speculation tag of said entry are resolved invalid, and if each speculative branch outcome matches the corresponding branch resolution output from said processing unit, sets said resolution status field of said control tag of said entry to a value indicating said speculations encoded by speculation tag of said entry are resolved valid.

59. The data processing system of claim 53, wherein each of said speculations comprise a speculative state of a condition register field upon completing an instruction that follows said STOUCH instruction.

60. The data processing system of claim 59, wherein said entry of said buffer corresponding to said STOUCH instruction comprises a control tag that includes at least a resolution status field, wherein said resolution status field indicates whether the speculations encoded by said speculation tag of said entry are one of: not yet resolved, resolved valid, and resolved invalid.

61. The data processing system of claim 60, wherein said STOUCH evaluation logic includes control logic that initially sets said resolution status field of said entry associated with said STOUCH instruction to a value indicating said speculations encoded by said speculation tag of said entry are not yet resolved;

for each speculative state of said condition register field encoded by said speculation tag of said entry, compares said speculative state to an actual state of said condition register field, if said speculative state does not match said actual state of said condition register field, sets said resolution status field of said control tag of said entry to a value indicating said speculations encoded by said speculation tag of said entry are resolved invalid, and if each speculative state matches the corresponding actual state of said condition register field, sets said resolution status field of said control tag of said entry to a value indicating said speculations encoded by said speculation tag of said entry are resolved valid.

62. The data processing system of claim 50, wherein said STOUCH instruction is inserted into said sequences of instructions at compile-time.

* * * * *